United States Patent
Takemoto et al.

(10) Patent No.: US 8,040,556 B2
(45) Date of Patent: Oct. 18, 2011

(54) IMAGE DATA GENERATING METHOD, PRINTING METHOD, IMAGE DATA GENERATING APPARATUS, AND PRINTER

(75) Inventors: Yasuhiro Takemoto, Kyoto (JP); Atsushi Imamura, Kyoto (JP); Hiroshi Asai, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 834 days.

(21) Appl. No.: 12/115,801

(22) Filed: May 6, 2008

(65) Prior Publication Data

US 2008/0291473 A1    Nov. 27, 2008

(30) Foreign Application Priority Data

May 24, 2007  (JP) ................................ P2007-137507
Nov. 8, 2007   (JP) ................................ P2007-290305

(51) Int. Cl.
*G06K 1/00*   (2006.01)
*B41J 29/38*  (2006.01)

(52) U.S. Cl. ............................................ 358/1.8; 347/5

(58) Field of Classification Search ................... 347/13, 347/35, 3; 358/1.12, 400, 401, 1.8, 502
See application file for complete search history.

(56) References Cited

U.S. PATENT DOCUMENTS

| | | | |
|---|---|---|---|
| 5,581,284 A | | 12/1996 | Hermanson |
| 7,377,608 B2 * | | 5/2008 | Walmsley et al. ............. 347/13 |
| 7,578,574 B2 * | | 8/2009 | Suzuki ............................. 347/35 |
| 2004/0160643 A1 | | 8/2004 | Sugizaki |
| 2005/0105105 A1 | | 5/2005 | Vestjens et al. |

FOREIGN PATENT DOCUMENTS

| | | |
|---|---|---|
| EP | 0 718 105 | 6/1996 |
| EP | 0 868 306 | 10/1998 |
| EP | 1 458 178 | 9/2004 |
| JP | 05-318867 | 12/1993 |
| JP | 2002-120366 | 4/2002 |
| JP | 2004-266810 | 9/2004 |
| JP | 2006-27036 | 2/2006 |

OTHER PUBLICATIONS

European Search Report issued on Jan. 12, 2010 in connection with corresponding European Patent Application No. 08008680.4 (EP 1 458 178 was previously submitted in an IDS filed Jun. 3, 2008 and is therefore not enclosed).

* cited by examiner

*Primary Examiner* — Jerome Grant, II
(74) *Attorney, Agent, or Firm* — Ostrolenk Faber LLP

(57) ABSTRACT

A head in a printer has an outlet row including a plurality of outlets arranged in a width direction perpendicular to a scan direction. A threshold matrix is stored in a main body control part, and sleep elements representing sleep of ejection of ink are arranged in the threshold matrix at a regular interval in each element row which is a plurality of elements arranged in a row direction corresponding to the width direction. The threshold matrix is compared with a grayscale original image to generate data of a halftone image where during printing, the number of outlets included in each outlet group not brought into sleep state continuously in the width direction is made equal to or larger than 1 and equal to or smaller than a predetermined number. Thus, it is possible to easily suppress occurrence of unevenness in a printed image, caused by cross talk between outlets.

38 Claims, 17 Drawing Sheets

IMAGE DATA GENERATING METHOD, PRINTING METHOD, IMAGE DATA GENERATING APPARATUS, AND PRINTER

BACKGROUND OF THE INVENTION

1. Field of the Invention

The present invention relates to a technique for generating image data used in an inkjet printer and a technique for printing with a head for ejecting fine droplets of ink onto a printing medium.

2. Description of the Background Art

Conventionally used has been an inkjet printer provided with a head having a plurality of outlets (nozzles), where the head moves relatively to a printing paper and printing is performed by controlling ON/OFF of ejection of fine droplet of ink from each outlet. In such a printer, recently, ejected fine droplets are further downsized and outlets are arranged at higher density, in order to print a high-definition image.

It is confirmed unevenness (mura) appears in a printed image in the case that ejection operation of ink is continuously performed by a predetermined number or more of continuous outlets in a head, and it has been known such unevenness is caused by adjacent outlets which affect one another in ejecting ink (so-called cross talk). Unevenness by the cross talk between the outlets more remarkably appears with higher density of arrangement of the outlets (i.e., as an arrangement pitch of the outlets is made smaller).

Japanese Patent Application Laid-Open No. 2002-120366 (Document 1) discloses a technique for suppressing variations in ejection velocities of ink depending on cross talk between outlets by dividing nozzles included in a nozzle row into a plurality of groups and setting different driving voltages in respective groups. Japanese Patent Application Laid-Open No. 2006-27036 (Document 2) discloses a technique for suppressing variations in droplet velocities by cross talk between outlets, by treating a pulse width, where a velocity change rate becomes smaller in a relationship between the droplet velocity and the pulse width of a driving voltage waveform, as a pulse width of the driving voltage waveform which is actually used. It is described in Document 2 that causes of occurrence of the cross talk are vibration of constituent members in driving the nozzles, variation in pressure generated in ink pressure chambers of the driving nozzles, variation in driving voltage depending on the number of driving nozzles, or the like.

In the technique of Document 1, however, a plurality of waveform generating circuits for generating a plurality of kinds of driving waveforms, a circuit for selecting one of the plurality of kinds of driving waveforms for each nozzle and the like are required, so a construction of an apparatus is complicated and upsized to increase the manufacturing cost of the apparatus. In the technique of Document 2, a complicate operation for acquiring the relationship between the droplet velocity and the pulse width of the driving voltage waveform is required.

SUMMARY OF THE INVENTION

The present invention is intended for a printing method of using a head for ejecting fine droplets of ink onto a printing medium and an image data generating method of generating image data used in an inkjet printer. It is an object of the present invention to easily suppress occurrence of unevenness in a printed image, caused by cross talk between outlets.

According to a printing method of using a head of the present invention, the head has one or more outlet rows arranged in a predetermined scan direction, each of the one or more outlet rows includes a plurality of outlets arranged in a width direction perpendicular to the scan direction, the printing method comprises the steps of: a) moving a printing medium relatively to the head in the scan direction; and b) performing ejection control of ink from the head while setting outlets of a sleep state in each of the one or more outlet rows, in parallel with the step a), and the number of outlets included in each outlet group which is brought into the sleep state continuously in the width direction is made to be equal to or larger than 1 and equal to or smaller than a predetermined number in each of the one or more outlet rows, and the number of outlets included in each outlet group which is not brought into the sleep state continuously in the width direction is made to be equal to or larger than 1 and equal to or smaller than a predetermined number in each of the one or more outlet rows, in the step b).

According to the present invention, it is possible to easily suppress occurrence of unevenness in a printed image caused by the cross talk between the outlets, while reducing degradation of the printed image.

According to a preferred embodiment of the present invention, an image data generating method of generating image data used in the printing method comprises the steps of: a) preparing a threshold matrix which is an array compared with a grayscale original image in generating a halftone image which represents ON/OFF of ejection of ink from the plurality of outlets in printing, the threshold matrix including sleep elements representing sleep of ejection of ink in each element row which is a plurality of elements arranged in a row direction corresponding to the width direction; and b) comparing the threshold matrix with the original image to generate data of a halftone image where while printing is performed, the number of outlets included in each outlet group which is brought into a sleep state continuously in the width direction is made to be equal to or larger than 1 and equal to or smaller than a predetermined number in each of the one or more outlet rows, and the number of outlets included in each outlet group which is not brought into the sleep state continuously in the width direction is made to be equal to or larger than 1 and equal to or smaller than a predetermined number in each of the one or more outlet rows. It is thereby possible to further easily suppress occurrence of unevenness in the printed image caused by the cross talk between the outlets, while reducing degradation of the printed image.

Preferably, values of elements excluding the sleep elements in the threshold matrix or values of pixels in the original image, are changed so that a density of the halftone image generated with the threshold matrix including the sleep elements is getting close to that of a halftone image generated with a threshold matrix not including sleep elements. As a result, it is possible to make a density of the printed image close to a density of a printed image generated with the threshold matrix not including the sleep elements.

According to another preferred embodiment of the present invention, an image data generating method of generating image data used in the printing method comprises the steps of: a) preparing a halftone image which represents ON/OFF of ejection of ink from the plurality of outlets in printing or a grayscale original image compared with a threshold matrix in generating a halftone image; and b) making sleep pixels representing sleep of ejection of ink, included in each pixel row which is a plurality of pixels arranged in a row direction corresponding to the width direction in the halftone image or the original image, to generate data of a final halftone image where while printing is performed, the number of outlets included in each outlet group which is brought into a sleep state continuously in the width direction is made to be equal to or larger than 1 and equal to or smaller than a predetermined number in each of the one or more outlet rows, and the number of outlets included in each outlet group which is not brought into the sleep state continuously in the width direction is made to be equal to or larger than 1 and equal to or smaller than a predetermined number in each of the one or more outlet rows. It is thereby possible to further easily suppress occurrence of unevenness in the printed image caused by the cross talk between the outlets, while reducing degradation of the printed image.

The present invention is also intended for an inkjet printer and an image data generating apparatus for generating image data used in an inkjet printer.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
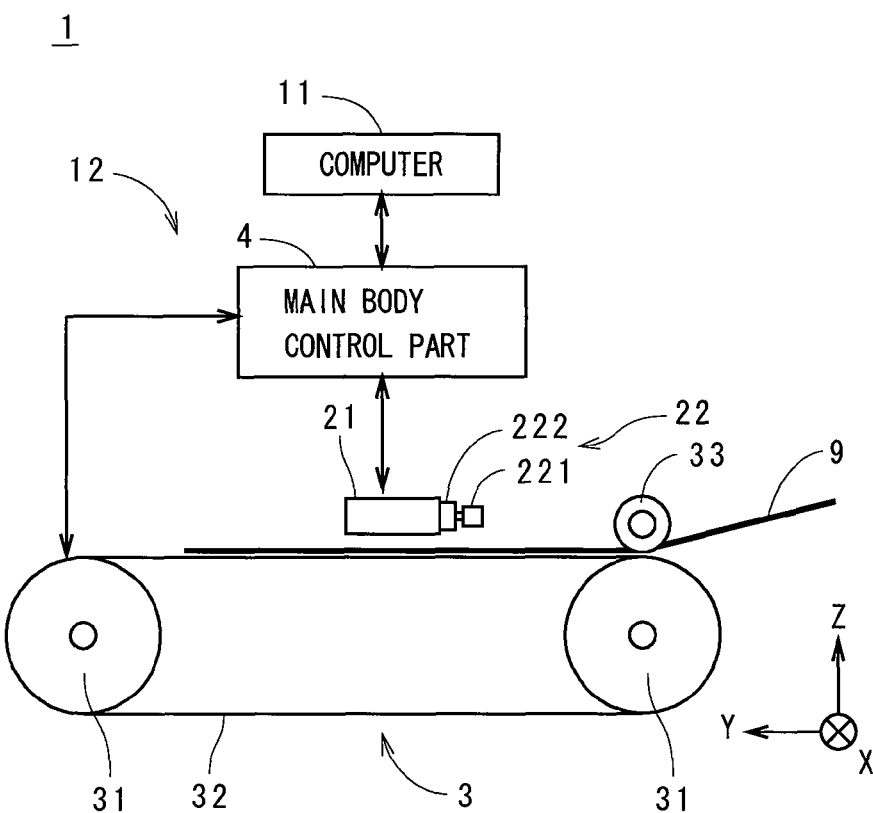
FIG. 1 is a view showing a constitution of a printer in accordance with the first preferred embodiment.

FIG. 1 is a view showing a construction of an inkjet printer 1 in accordance with the first preferred embodiment of the present invention. The printer 1 is an image recording apparatus for recording images of a plurality of color components on a printing paper 9 where the images are overlapped on the printing paper 9. A main body 12 of the printer 1 has a head 21 for ejecting fine droplets of ink onto the printing paper 9, a head moving mechanism 22 for moving the head 21 in the X direction of FIG. 1 along the printing paper 9, a feeder 3 for moving the printing paper 9 toward the Y direction perpendicular to the X direction under the head 21, and a main body control part 4 which is connected to the head 21, the head moving mechanism 22, and the feeder 3. A computer 11, which has a CPU for performing various computations, a memory for storing various information and the like, is connected to the main body control part 4. In the printer 1, the main body 12 receives a signal from the computer 11 and prints a color halftone image (halftone dot image) on the printing paper 9.

The feeder 3 has two belt rollers 31 connected to a not-shown motor and a belt 32 hanging between the two belt rollers 31. The printing paper 9 is guided onto the belt 32 through a roller 33 positioned above the belt roller 31 on the (−Y) side to be held thereon and moves toward the (+Y) side together with the belt 32, passing under the head 21.

The head moving mechanism 22 is provided with a loop-like timing belt 222 which is long in the X direction, and a motor 221 reciprocally moves the timing belt 222 to thereby smoothly move the head 21 in a direction (the X direction in FIG. 1 and the direction corresponds to the width of the printing paper 9 and hereinafter, referred to as "width direction") which is perpendicular to a feeding direction (the Y direction in FIG. 1 and hereinafter, also referred to as "scan direction") of the printing paper 9 along the printing paper 9.

Figure 2:
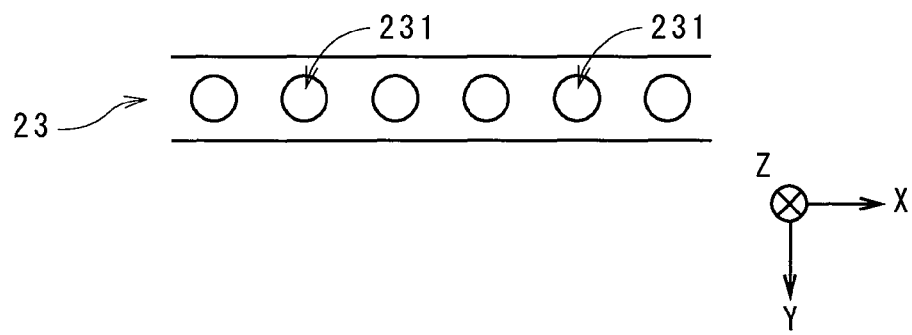
FIG. 2 is a view showing an outlet row.

The head 21 has a plurality of modules arranged in the Y direction and each module can eject ink of one of a plurality of colors. As shown in FIG. 2, a plurality of outlets 231 each of which ejects droplets of ink onto the printing paper 9 (toward the (−Z) direction in FIG. 1) are provided in each module, and the plurality of outlets 231 are arranged at a regular pitch (e.g., a pitch of 0.14 millimeter (mm) corresponding to 180 dpi (dot per inch) and hereinafter, referred to as "outlet pitch") toward the width direction in a plane parallel to the printing paper 9 (the plane parallel to the XY plane). Actually, by driving a piezoelectric element provided in each outlet 231, droplets of ink are ejected from the outlet 231. In the printer 1, the plurality of outlets 231 are arranged so as to cover the entire printing area on the printing paper 9 with respect to the width direction (i.e., to cover the range which is equal to or wider than the effective print area on the printing paper 9). In the following discussion, the plurality of outlets 231 arranged in a line in each module are referred to as an "outlet row 23".

While printing is not performed in the printer 1, the head moving mechanism 22 disposes the head 21 at a predetermined home position and the plurality of outlets 231 are closed with lib members at the home position, to prevent the outlets 231 from being blocked by drying of the ink in the vicinities of the outlets. Though the head 21 ejects ink of black, cyan, magenta, and yellow in the preferred embodiment for convenience of description, ink of other color components such as light cyan may be ejected in the printer 1.

Figure 3:
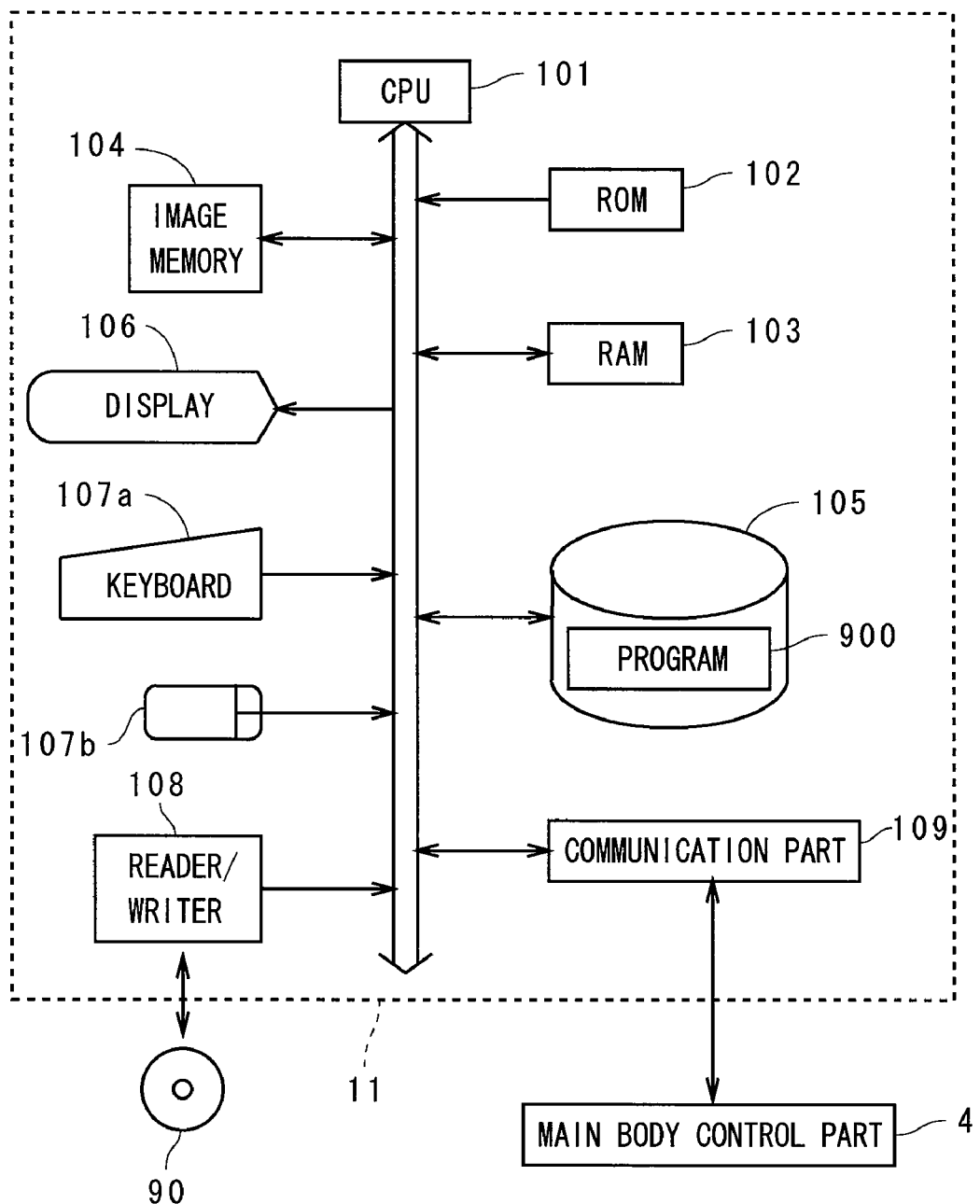
FIG. 3 is a view showing a structure of a computer.

As shown in FIG. 3, the computer 11 has a structure of general computer system where a CPU 101 for performing various computations, a ROM 102 for storing a basic program and a RAM 103 for storing various information are connected to a bus line. To the bus line, an image memory 104 for storing data of a color image (that is to say, each pixel in the image has pixel values of the plurality of color components and hereinafter, the image is referred to as an "original image") to be represented by halftoning (halftone dots), a fixed disk 105 for storing information, a display 106 for displaying various information, a keyboard 107a and a mouse 107b for receiving an input from an operator, a reader/writer 108 which reads information from a computer-readable recording medium 90 such as an optical disk, a magnetic disk or a magneto-optic disk and writes information into the recording medium 90, and a communication part 109 for making communications with the main body control part 4 are further connected through interfaces (I/F) as appropriate.

In the computer 11, a program 900 is read out from the recording medium 90 through the reader/writer 108 in advance and stored in the fixed disk 105. The program 900 is copied in the RAM 103, the CPU 101 performs a computation according to the program 900 in the RAM 103 (that is, the computer 11 executes the program), and the computer 11 thereby performs a process of generating threshold matrixes (dither matrixes) used in halftoning of the grayscale original image. The threshold matrixes and the data of the color original image stored in the image memory 104 are transmitted to the main body control part 4 through the communication part 109.

Figure 4:
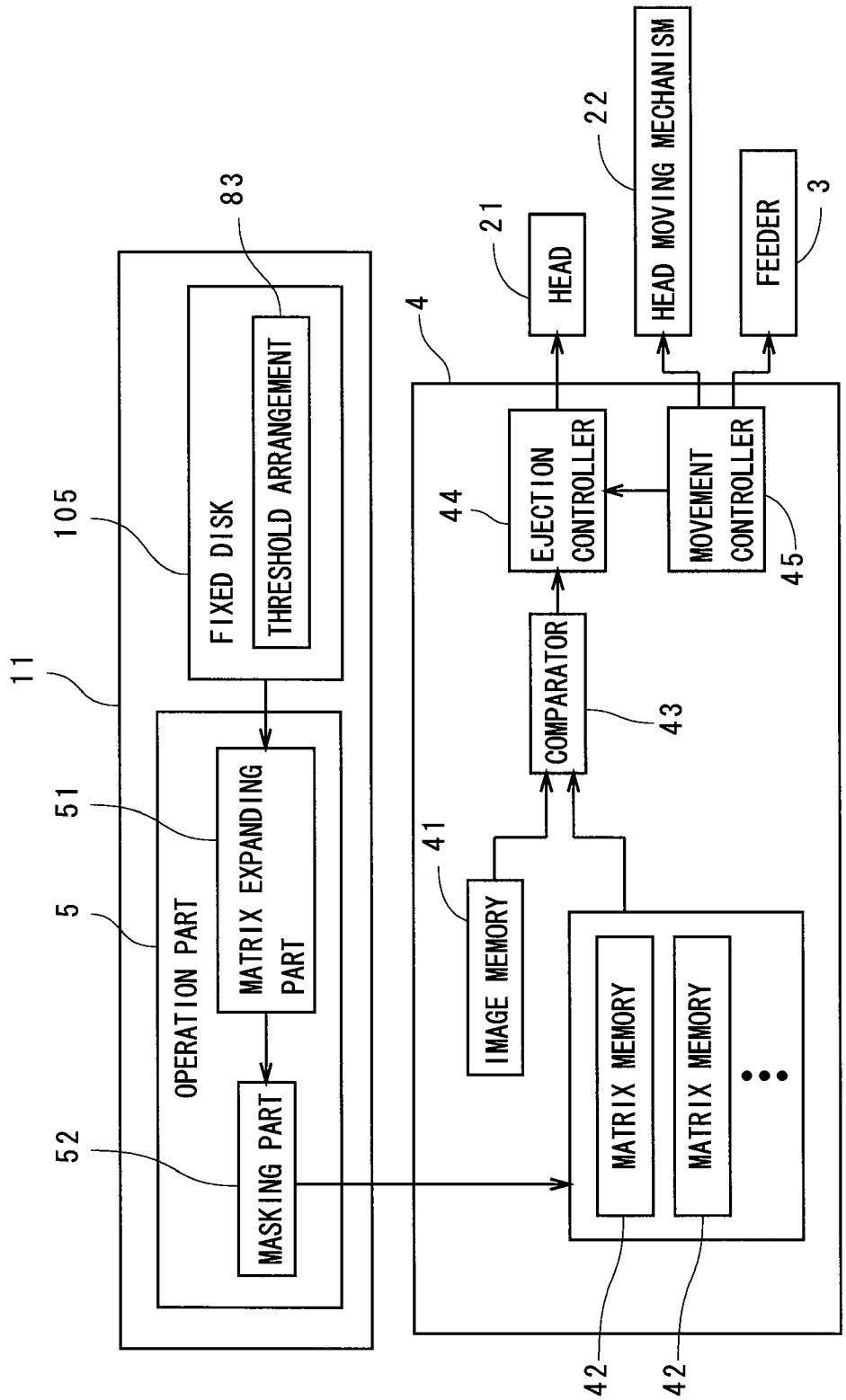
FIG. 4 is a block diagram showing a functional constitution of the printer.

FIG. 4 is a block diagram showing a functional constitution of the printer 1. Functions of a matrix expanding part 51 and a masking part 52 in an operation part 5 of FIG. 4 are achieved by the computer 11. The main body control part 4 has an image memory 41 for storing the data of the color original image, a plurality of matrix memories 42 (SPM (Screen Pattern Memories)) for respectively storing the threshold matrixes of the plurality of color components, a comparator 43 (halftoning circuit) for comparing the grayscale original image with the threshold matrix for each color component, a movement controller 45 for controlling relative movement of the printing paper 9 to the head 21, and an ejection controller 44 for controlling ejection of ink from the plurality of outlets 231 of the head 21 in synchronization with the relative movement of the printing paper 9. The functions of the operation part 5 may be implemented by dedicated electric circuits, or may be partially implemented by the electric circuits (the same is applied in an operation part 5a which is discussed later).

Next discussion will be made on an operation for printing in the printer 1, referring to FIG. 5. When printing is performed in the printer 1, first, the threshold matrixes used in the actual printing are outputted to the main body control part 4 from the computer 11 (the threshold matrixes may be outputted in advance) and they are stored and prepared in the matrix memories 42 (Step S11). Though the following discussion will be made on only the threshold matrix for one color of four threshold matrixes prepared for the four colors, i.e., black, cyan, magenta and yellow, respectively, the threshold matrix for each of the other colors has the same data construction and is used in the same manner.

Figure 6:
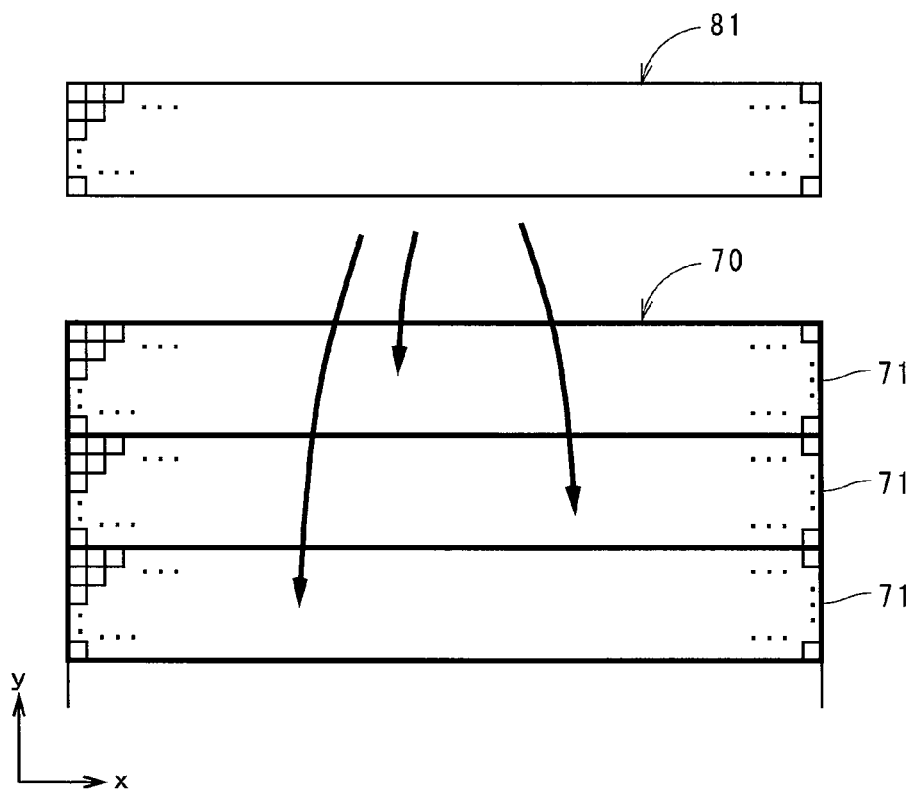
FIG. 6 is a view abstractly showing a threshold matrix and an original image.

FIG. 6 is a view abstractly showing a threshold matrix 81 and the original image 70. The threshold matrix 81 is a two-dimensional array where a plurality of elements are arranged in a row direction corresponding to the width direction (the row direction is shown as the x direction in FIG. 6) and a column direction corresponding to the scan direction (the column direction is shown as the y direction in FIG. 6). The number of positions in the row direction (i.e., the number of elements arranged in the row direction) is the same as that of the plurality of outlets 231 of each module in the head 21, and the plurality of positions in the row direction are associated with the plurality of outlets 231, respectively. Each module of the head 21 has 14400 outlets 231 in the present preferred embodiment. The number of positions in the column direction of the threshold matrix 81 (i.e., the number of elements arranged in the column direction) is 12, and the threshold matrix 81 is an array of the elements in 12 rows and 14400 columns, elongating in the row direction. A process of generating the threshold matrix will be discussed later.

Subsequently, in the comparator 43 of FIG. 4 which is an image data generator, the original image 70 stored in the image memory 41 is compared with the threshold matrix 81 for each color component which is stored in the matrix memory 42 and halftoning is thereby performed on the original image 70 (i.e., the original image 70 is represented by halftone dots), to generate data of a halftone image (hereinafter, the data is also simply referred to as "halftone image") used for printing in the printer 1 (Step S12).

In the original image 70, the number of pixels in a direction corresponding to the width direction (hereinafter, the direction is referred to as the row direction like the threshold matrix 81) is the same as that of the positions in the row direction of the threshold matrix 81 (or the original image 70 is converted so that the number of pixels in the row direction of the original image 70 becomes equal to that of the positions in the row direction of the threshold matrix 81). The original image 70 is divided in a direction corresponding to the scan direction (hereinafter, the direction is referred to as the column direction like the threshold matrix 81), and each of the divided areas is set as a repeat area 71 (shown by thick lines in FIG. 6) which is a unit of halftoning. At this time, since the length in the column direction of the repeat area 71 is the same as that in the column direction of the threshold matrix 81, the plurality of pixels included in one repeat area 71 correspond to the plurality of elements in the threshold matrix 81, respectively.

In halftoning of the original image, a pixel value of each pixel (a gray level of each pixel) in the repeat area 71 of the original image is compared with a threshold value of an element of the threshold matrix 81 corresponding to the pixel value, to determine a pixel value at the position (address) of the above pixel in a binary halftone image. Specifically, in (a part of) the original image 70 shown in FIG. 6, for example, a pixel value "1" is assigned (i.e., a dot is set) at each position where a pixel value is larger than the threshold values of the elements of the threshold matrix 81 corresponding to the pixel value, and a pixel value "0" is assigned (i.e., a dot is not set) at each of remaining pixels. In this way, in the main body control part 4, halftoning is performed on the original image 70 with using the threshold matrix 81 to generate data of the halftone image which represents ON/OFF of ejection of ink from the plurality of outlets 231 in printing discussed later.

In the printer 1 of FIG. 1, when a part of data of the halftone image (for example, the portion corresponding to a repeat area 71 at the end on the (+y) side which is first printed is generated for each color, movement of the printing paper 9 toward the scan direction is started by the feeder 3 which is driven by the movement controller 45 (Step S13) and in parallel with the above process of halftoning (generating process of data of halftone image), ejection of ink from the plurality of outlets 231 included in each module of the head 21 is controlled by the ejection controller 44 in synchronization with movement of the printing paper 9 (Step S14).

Since the halftone image is printed on the printing paper 9, the plurality of pixels in the halftone image are considered to be arranged on the printing paper 9. In the ejection controller 44, in parallel with relative movement of the head 21 to the printing paper 9, when a pixel value in the halftone image corresponding to an ejection position of each outlet 231 on the printing paper 9 is "1", a dot is formed on the ejection position, and when the pixel value in the halftone image is "0", a dot is not formed on the ejection position. In this way, with respect to each component of black, cyan, magenta, and yellow, ejection of ink from the plurality of outlets 231 is controlled in accordance with the pixel values in the halftone image corresponding to the ejection positions of the plurality of outlets 231 relative to the printing paper 9, while moving the plurality of ejection positions on the printing paper 9, which individually correspond to the plurality of outlets 231, relatively to the printing paper 9.

In the printer 1, operations for recording halftone images of black, cyan, magenta and yellow on the printing paper 9 while generating the halftone images, are performed in parallel, and a color halftone image (printed image) representing the color original image is printed on the printing paper 9. After the whole halftone image is printed on the printing paper 9, movement of the printing paper 9 is stopped to complete the printing operation in the printer 1 (Step S15).

Next discussion will be made on a generating process of the threshold matrix 81 used in printing in the printer 1 with reference to FIG. 7.

In the printer 1, data of threshold arrangement (hereinafter, the data is simply referred to as "threshold arrangement") 83 which is a basis for generating the threshold matrix 81 is stored in the fixed disk 105 (or the RAM 103) in the computer 11 in advance and the operation part 5 reads the threshold arrangement 83.

Figures 7, 8:
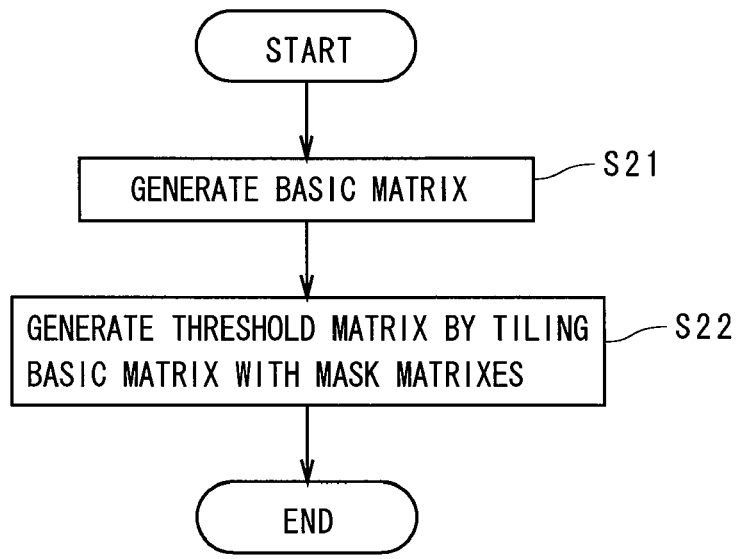
FIG. 7 is a flowchart showing a process flow for generating the threshold matrix.
FIG. 8 is a view showing a threshold arrangement.

FIG. 8 is a view showing the threshold arrangement 83. In this case, a matrix of Bayer type, where values (threshold values) different from one another are arranged in 4 rows and 4 columns in the row direction corresponding to the width direction (the row direction is shown as the x direction in FIG. 8) and the column direction corresponding to the scan direction (the column direction is shown as the y direction in FIG. 8), is prepared as the threshold arrangement 83. Normally, in a case where the range of gray levels (the grayscale range) of the original image is 0 to N (N is a positive integer), one of values (integers) which are equal to or larger than 0 and equal to or smaller than (N−1) is set at each of positions in the threshold arrangement 83. Actually, prepared is a threshold arrangement whose size is fully larger than the threshold arrangement in 4 rows and 4 columns. Various threshold arrangements may be used in the printer 1, such as a threshold arrangement for AM (Amplitude Modulated) halftoning where gray levels are represented by growing halftone dot areas from dot centers which are regularly arranged, a threshold arrangement for cluster-type halftoning where dot centers are irregularly arranged, or a threshold arrangement for FM (Frequency Modulated) halftoning where gray levels are represented by changing the number of dots of certain size, the dots being irregularly arranged.

Figure 9:
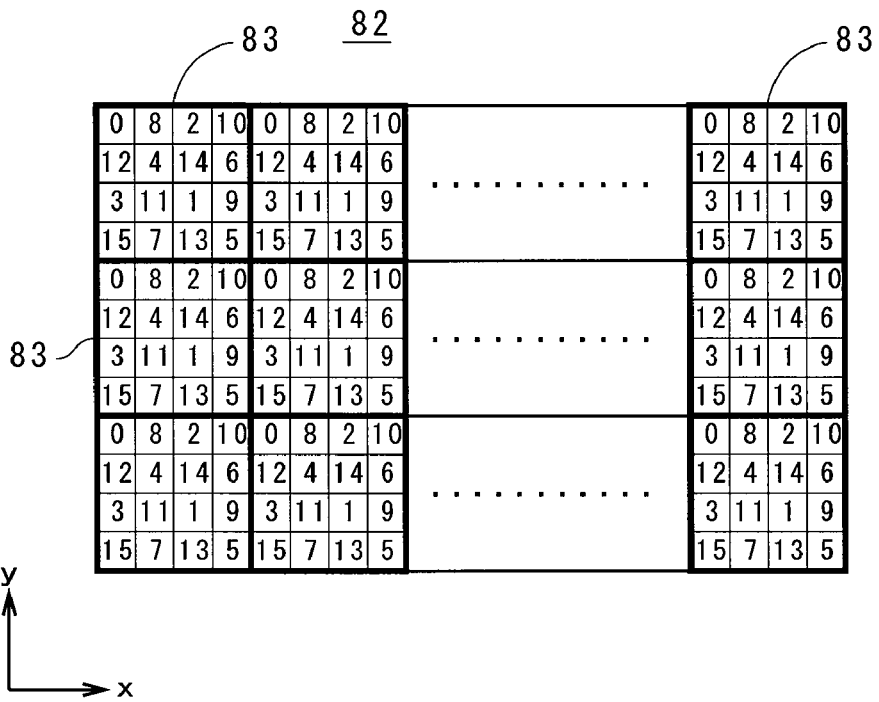
FIG. 9 is view showing a basic matrix.

In the matrix expanding part 51 of the operation part 5, 3600 threshold arrangements 83 are arranged in the row direction to form a threshold arrangement in 4 rows and 14400 columns, and the threshold arrangement is repeatedly arranged in the column direction to generate a threshold arrangement 82 in 12 rows and 14400 columns as shown in FIG. 9 (the threshold arrangement 82 is an original matrix of the threshold matrix 81 and hereinafter, referred to as a "basic matrix" 82) (Step S21). In FIG. 9, each threshold arrangement 83 is shown by a thick-line rectangle. The basic matrix may be generated by repeatedly arranging a plurality of kinds of threshold arrangements in the x direction and the y direction.

As described earlier, since the 14400 outlets are arranged in the head 21, a plurality of columns in the basic matrix 82 correspond to the plurality of outlets 231 included in the head 21, respectively. The basic matrix 82 is outputted to the masking part 52 to perform a process using a mask matrix which is prepared in advance.

Figure 10:
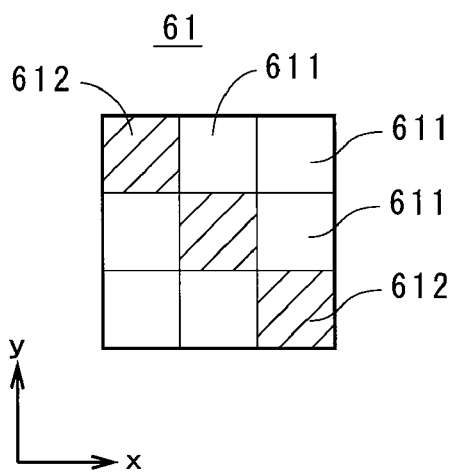
FIG. 10 is a view showing a mask matrix.

FIG. 10 is a view showing a mask matrix 61 used in the masking part 52. As shown in FIG. 10, elements are arranged in the row direction corresponding to the width direction (the row direction is shown as the x direction in FIG. 10) and the column direction corresponding to the scan direction (the column direction is shown as the y direction in FIG. 10) in the mask matrix 61, and one mask element 612 (shown by hatching in FIG. 10) is included in each row (i.e., each group of elements arranged in the x direction) in the mask matrix 61. In the present preferred embodiment, the mask matrix 61 is an element matrix in 3 rows and 3 columns, two non-mask elements 611 and one mask element 612 are included in each row in the mask matrix 61, and a position in the row direction of the mask element 612 in one row is different from positions of the mask elements 612 in the other rows.

In the masking part 52, a process of overlapping a matrix with the basic matrix 82, the matrix being obtained by repeatedly arranging the mask matrixes 61 in the row and column directions, that is, a process of tiling the basic matrix 82 with the mask matrixes 61 is performed (see FIG. 11 discussed later), and in this case, elements in the basic matrix 82 which are overlapped with the mask elements 612 are changed to sleep elements. The sleep element is an element for assigning a value representing sleep (OFF) of ejection of ink (the value is the pixel value "0" in the above example) to a position (pixel) in the halftone image corresponding to the sleep element in generation of the halftone image which is discussed earlier, and the sleep element in the preferred embodiment has an element value (threshold value) representing the maximum gray level in the whole grayscale range of the original image.

Figure 11:
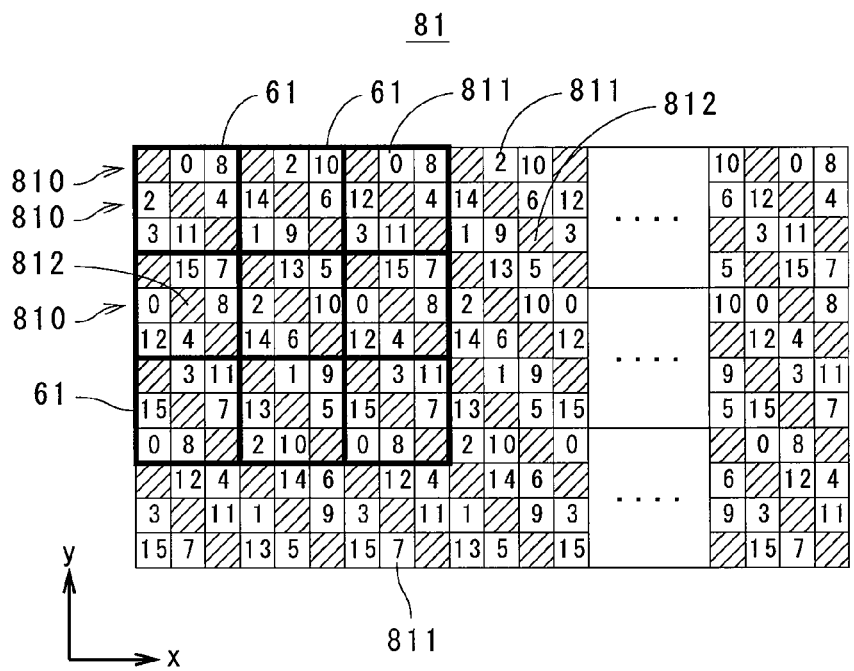
FIG. 11 is a view showing a threshold matrix.

Actually, a process of inserting elements (sleep elements) having the value representing the maximum gray level, at respective positions in the basic matrix 82 which are overlapped with the mask elements 612, is performed in the masking part 52, and threshold values on the (+x) side of each of the positions are sequentially shifted in the (+x) direction. Threshold values exist on the (+x) side of a column at the end on the (+x) side (the 14400th column) in the basic matrix 82 by shifting threshold values with inserting of the sleep elements and the threshold values are removed. In this manner, elements in the basic matrix 82 which are overlapped with the mask elements 612 are changed to the sleep elements to easily generate a threshold matrix 81 used in the actual printing as shown in FIG. 11 (Step S22). In FIG. 11, respective outer forms of the mask matrixes 61 which are overlapped are shown by thick-line rectangles and each sleep element 812 is shown by hatching (the same is applied in FIG. 13 discussed later).

In the threshold matrix 81 shown in FIG. 11, a plurality of elements 811 arranged in the row direction are treated as an element row 810 and every third element in each element row 810 is the sleep element 812 (i.e., the sleep elements 812 exist at an interval of distance of three elements in the row direction in each element row 810 (two elements exist between adjacent sleep elements 812 in each element row 810)). Since the mask matrix 61 is a square matrix in 3 rows and 3 columns and the mask elements 612 are diagonally arranged in the mask matrix 61, every third element in a plurality of elements 811 arranged in the column direction in the threshold matrix 81 is the sleep element 812 (i.e., the sleep elements 812 are not continuously positioned in the column direction) and a plurality of sleep elements 812 are arranged in a direction forming an angle of 45 degrees with the row direction and the column direction. As described earlier, since the process of inserting the sleep elements into the basic matrix 82 is performed, the characteristics of arrangement of threshold values in the basic matrix 82 are almost maintained in the threshold matrix 81.

As discussed earlier, in generation of the halftone image, only when a pixel value of a pixel in the original image 70 is larger than the threshold value of the element 811 of the threshold matrix 81 corresponding to the pixel value, a value representing ON of ejection of ink is assigned to the position in the halftone image corresponding to the pixel. The value representing the maximum gray level of the original image is assigned to each of the sleep elements 812 in the threshold matrix 81 and thereby, a pixel value representing OFF of ejection of ink is certainly assigned to each of positions in the halftone image corresponding to the sleep elements 812. As discussed above, each of the pixels in the halftone image corresponding to the sleep elements 812 in the threshold matrix 81 is a sleep pixel representing OFF of ejection of ink, and also in the halftone image, every third pixel in each pixel row which is a plurality of pixels arranged in the row direction is a sleep pixel (i.e., the sleep pixels exist at an interval of distance of three pixels in the row direction in each pixel row).

Figure 12A:
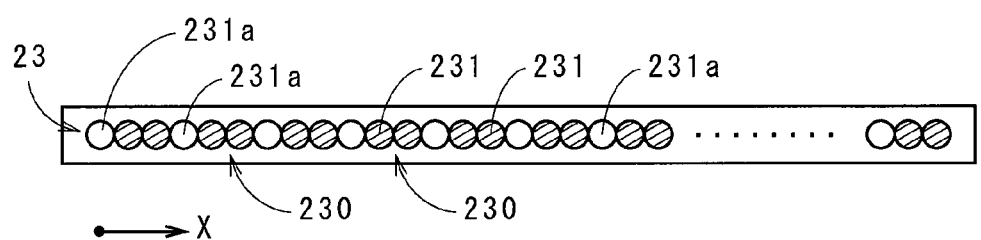
FIGS. 12A and 12B are views each showing an outlet row.

If a state where ejection of ink in outlets 231 in the head 21 is forcefully made to OFF on the basis of the sleep pixels in the halftone image (or the sleep elements 812 in the threshold matrix 81) in the actual printing, is referred to as a "sleep state", in an outlet row 23 shown in FIG. 12A (the plurality of outlets 231 in FIG. 12A are made close to one another in the X direction and this is applied to FIGS. 12B, 14A, 14B, 16A and 16B discussed later), every third outlet from the outlet at the end on the (−X) side (i.e., outlets existing at an interval three times the outlet pitch in the X direction and each of the outlets is shown by the reference sign 231*a* in FIG. 12A) is brought into the sleep state when writing of a part of the halftone image corresponding to the first (uppermost) element row 810 (the element row 810 at the end on the (+y) side) in the threshold matrix 81 of FIG. 11 is performed, and ejection control of ink is performed in the other outlets 231 which are not brought into the sleep state (the outlets 231 are shown by hatching in FIG. 12A and the same is applied to FIGS. 12B, 14A, 14B, 16A, 16B, 17, 19 and 20 discussed later) in accordance with comparison results between the original image 70 and the threshold matrix 81 (the case where ejection of ink is made to OFF on the basis of the comparison results is included in this case and the same is applied to the following discussion).

Figure 12B:
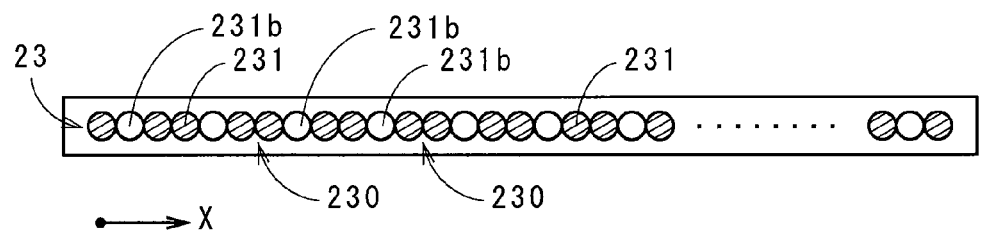

When writing of a part of the halftone image corresponding to the second (one lower) element row 810 in the threshold matrix 81 of FIG. 11 is performed, every third outlet from the second outlet from the (−X) side (each of the outlets is shown by the reference sign 231*b* in FIG. 12B) is brought into the sleep state in an outlet row 23 shown in FIG. 12B, and ejection control of ink is performed to the other outlets 231 in accordance with the comparison results between the original image 70 and the threshold matrix 81.

Therefore, if outlets 231 which are not continuously brought into the sleep state in the width direction (i.e., the outlets 231 shown by hatching in FIGS. 12A and 12B and a state of the outlet 231 capable of ejecting ink is hereinafter referred to as an "active state") are referred to as an "active outlet group", two outlets 231 are always included in each active outlet group (shown by the reference sign 230 in FIGS. 12A and 12B) in the outlet row 23. With this operation, in the printer 1, it is possible to surely prevent ejection operation of ink from being concurrently performed in a large number of outlets 231 which are continuously arranged in the width direction, and to reduce cross talk between adjacent outlets 231 affecting one another. Consequently, it is possible to suppress occurrence of unevenness in a printed image caused by the cross talk between the outlets 231 easily and at a low cost, without providing the electric circuits for generating the plurality of kinds of driving waveforms and the like, as disclosed in the above technique of Japanese Patent Application Laid-Open No. 2002-120366 (Document 1).

Since the sleep elements 812 are not continuously positioned in the column direction in the threshold matrix 81, the outlets 231*a*, 231*b* brought into the sleep state are switched to other outlets 231 every time when the outlet row 23 performs the ejection operation of ink corresponding to one pixel row in the halftone image, as shown in FIGS. 12A and 12B. Thus, it is possible to prevent the same outlets 231 from being continuously (in terms of time) brought into the sleep state in printing (naturally, the same outlets 231 can be continuously made to OFF in accordance with the comparison results between the original image 70 and the threshold matrix 81) and to suppress blockage of the outlets 231 by drying of the ink in the vicinities of the outlets 231 in printing.

Figure 13:
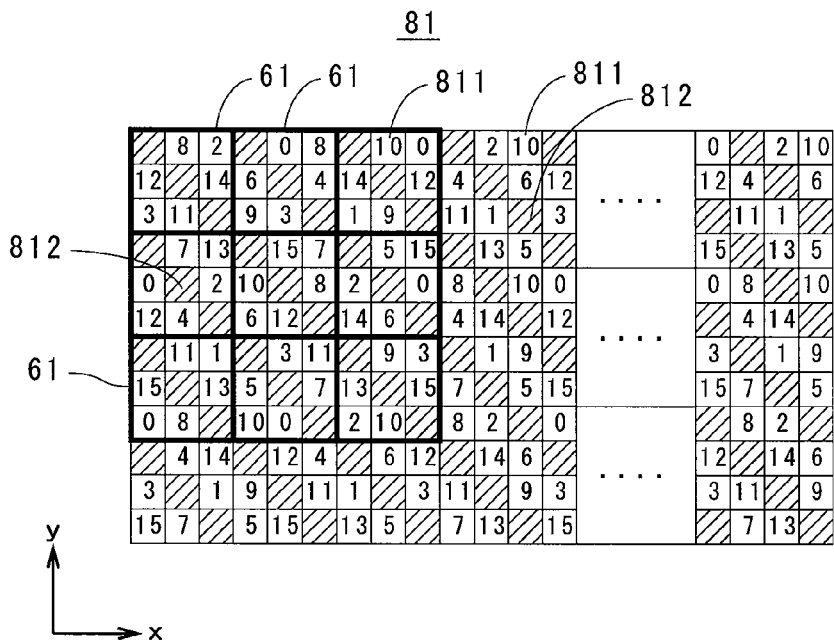
FIG. 13 is a view showing another example of the threshold matrix.

Though the sleep element 812 is inserted at each of positions in the basic matrix 82 which are overlapped with the mask elements 612 in tiling the basic matrix 82 with the mask matrixes 61 in the process of Step S22 in FIG. 7, there may be a case where elements in the basic matrix 82 which are overlapped with the mask elements 612 are replaced with the sleep elements 812 (i.e., original threshold values of the elements are removed to assign threshold values of the sleep elements 812 to the elements), to generate a threshold matrix 81 shown in FIG. 13. Actually, a preferable technique out of the technique for inserting the sleep elements 812 and the technique for replacing with the sleep elements 812, is selected and used.

For example, in a case where the size of the mask matrix 61 conforms to an interval of arrangement of threshold values in the basic matrix 82, if the technique for replacing elements in the basic matrix 82 with the sleep elements 812, the elements being overlapped with the mask elements 612, is used, constant threshold values in the threshold matrix 81 are replaced with the values each representing the maximum gray level of the original image 70 and therefore, it is not possible to appropriately represent change of densities in the vicinities of the gray level corresponding to the threshold values in the halftone image. Therefore, in such a case, it is preferable the technique for inserting the sleep element 812 at each of positions in the basic matrix 82 which are overlapped with the mask elements 612 is used. On the other hand, there is a possibility unexpected beat occurs in the halftone image by using the technique for inserting the sleep elements 812, depending on the basic matrix 82. In such a case, it is preferable the technique for replacing elements in the basic matrix 82, which are overlapped with the mask elements 612, with the sleep elements 812 is used.

Figure 14A:
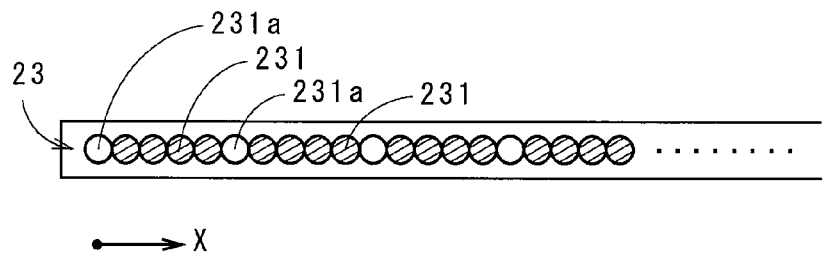
FIGS. 14A and 14B are views each showing an outlet row.
Figure 14B:
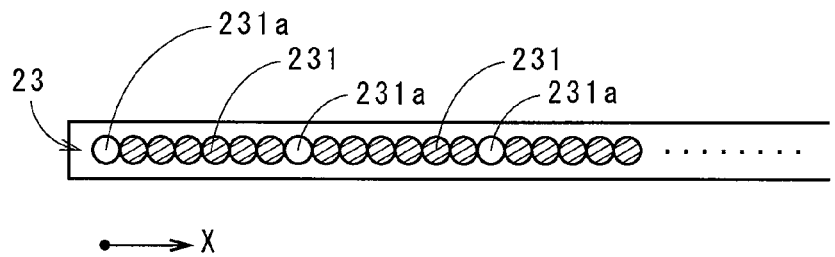

Although every third outlet 231*a*, 231*b* is brought into the sleep state in the outlet rows 23 shown in FIGS. 12A and 12B, for example, there may be a case where every fifth outlet 231*a* in an outlet row 23 is brought into the sleep state (i.e., outlets 231 which are brought into the sleep state exist at an interval five times the outlet pitch in the width direction (X direction)) as shown in FIG. 14A, or every seventh outlet 231*a* in an outlet row 23 is brought into the sleep state (i.e., outlets 231 which are brought into the sleep state exist at an interval seven times the outlet pitch in the width direction) as shown in FIG. 14B. Following discussion will be made on a preferable determination technique of an interval of outlets which are brought into the sleep state in the width direction.

Figure 15:
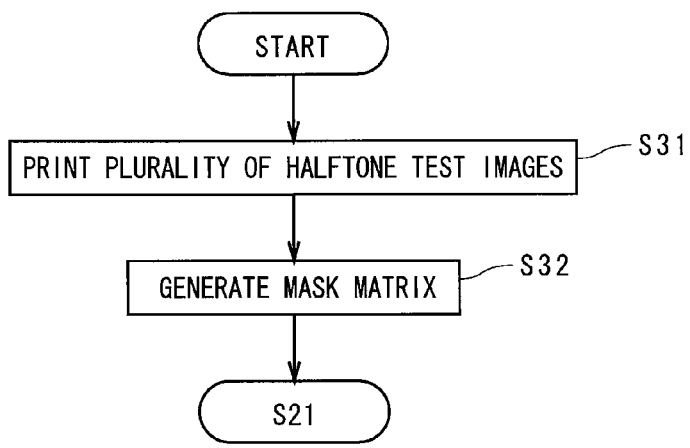
FIG. 15 is a flowchart showing a part of a process flow for generating a threshold matrix.

FIG. 15 is a flowchart showing a part of a process flow for generating a threshold matrix 81 and shows processes performed before the process of Step S21 in FIG. 7.

In the present operation example, (data of) a plurality of halftone images where intervals of sleep pixels in each pixel row are different from one another are prepared as a plurality of halftone test images in advance (in the plurality of halftone test images, the value representing ON of ejection of ink is assigned to each of pixels other than the sleep pixels), and the plurality of halftone test images are actually printed on the printing paper 9 in the printer 1 (Step S31). For example, a halftone test image where the outlets 231a brought into the sleep state exist at an interval three times the outlet pitch in the width direction in the outlet row 23 as shown in FIG. 12A, a halftone test image where the outlets 231a brought into the sleep state exist at an interval five times the outlet pitch as shown in FIG. 14A, and a halftone test image where the outlets 231a brought into the sleep state exist at an interval seven times the outlet pitch as shown in FIG. 14B, are printed on the printing paper 9. As discussed earlier, the value representing ON of ejection of ink is assigned to each of pixels other than the sleep pixels in the halftone test images, and the outlets 231 which are not brought into the sleep state certainly perform ejection of ink.

In this case, if a state where two outlets 231 continuously arranged in the row direction are made to ON and one outlet 231a is made to OFF in the outlet row 23 shown in FIG. 12A, is expressed as a state where ejection control of 2ON1OFF is performed in the outlet row 23, since four outlets 231 continuously arranged in the row direction are made to ON and one outlet 231a is made to OFF in the outlet row 23 shown in FIG. 14A, ejection control of 4ON1OFF is performed in the outlet row 23, and since six outlets 231 continuously arranged in the row direction are made to ON and one outlet 231a is made to OFF in the outlet row 23 shown in FIG. 14B, ejection control of 6ON1OFF is performed in the outlet row 23. Sleep pixels in a plurality of pixel rows in the halftone test images may be located on the same positions.

A halftone image where the value representing ON of ejection of ink is assigned to each of all the pixel values (the halftone image is a so-called solid image and hereinafter referred to as a "base image") is also printed on the printing paper 9. An actual density (e.g., an average density) of each of the printed images (the halftone test images and the base image) printed on the printing paper 9 is measured to obtain a ratio ($\alpha/\beta$) between a density $\alpha$ of each halftone test image on the printing paper 9 and a density $\beta$ of the base image on the printing paper 9. The base image may be printed in advance to obtain its density (i.e., halftone dot area rate on the actual printing paper).

A lower limit value of the density ratio between the halftone test image and the base image is determined in advance in the printer 1. Out of halftone test images each having a density ratio higher than the lower limit value, a halftone test image including the largest number of sleep elements in each pixel row is specified, and a mask matrix is generated on the basis of the specified halftone test image (Step S32). For example, when a halftone test image where the outlets 231a brought into the sleep state exist at an interval five times the outlet pitch in the width direction in the outlet row 23 as shown in FIG. 14A (i.e., the halftone test image where every fifth outlet 231 is brought into the sleep state) is specified, a mask matrix in 5 rows and 5 columns where one mask element is included in each row and the remaining elements are the non-mask elements is generated and set in the masking part 52. In this time, preferably, mask elements are not continuously positioned in the column direction. The halftone test image used in generation of the mask matrix may be specified on the basis of evaluation items other than the density ratio.

Then, the basic matrix 82 is derived from the threshold arrangements 83 (FIG. 7: Step S21) and the mask matrixes are applied to the basic matrix 82 to generate a threshold matrix (Step S22). As described earlier, since the positions of the sleep elements in the threshold matrix depend on the positions of the mask elements in the mask matrix, the positions of the sleep elements in the threshold matrix are substantially determined by the generation of the mask matrix in the process of Step S32. In printing, the threshold matrix is compared with the original image to generate data of a halftone image used in the actual printing. The positions of the sleep pixels in each pixel row in the data of the halftone image are the same as those in the element row in the threshold matrix corresponding to the pixel row, to thereby suppress decrease of a density in a printed image printed with the data of the halftone image.

As discussed above, the plurality of halftone test images where the positions of the sleep pixels are different from one another are printed on the printing paper 9 in the printer 1, and the positions of the sleep elements included in the threshold matrix are determined on the basis of the plurality of halftone test images printed on the printing paper 9. Thus, it is possible to generate preferable data of a halftone image which is capable of suppressing occurrence of unevenness in a printed image, caused by the cross talk between the outlets.

Next discussion will be made on a technique for approximating a density in a printed image to the case where the outlets of the sleep state are not set (i.e., a technique for almost maintaining a density in a printed image), while suppressing occurrence of unevenness by the cross talk between the outlets.

As discussed earlier, although the threshold matrix 81 of FIG. 11 including the sleep elements (naturally, the threshold matrix 81 may be one shown in FIG. 13) is generated by applying the mask matrixes 61 of FIG. 10 to the basic matrix 82 of FIG. 9, it is also possible to generate a halftone image not including the sleep pixels with use of the basic matrix 82 (the basic matrix 82 can be considered as a threshold matrix not including the sleep elements) and to perform printing without setting the outlets of the sleep state in the printer 1 according to the present technique.

Figure 5:
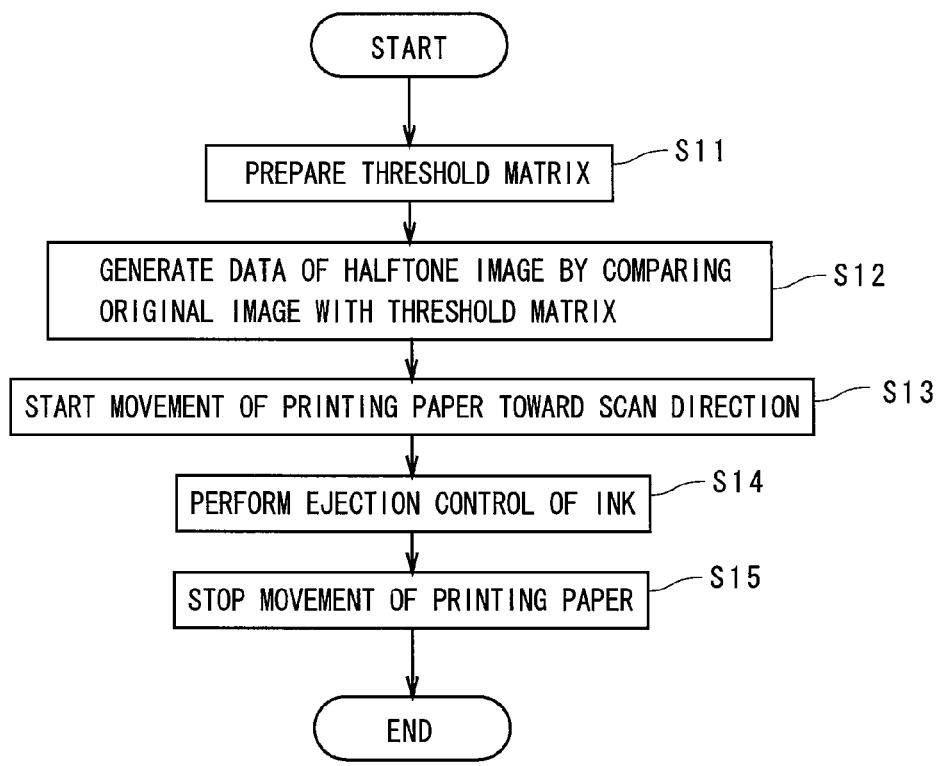
FIG. 5 is a flowchart showing an operation flow for printing in the printer.

In the printer 1, after the threshold matrix 81 including the sleep elements is selected by an operator and prepared in the matrix memory 42 (FIG. 5: Step S11), the threshold matrix 81 is compared with the original image to generate a halftone image including the sleep pixels (Step S12). Movement of the printing paper 9 toward the scan direction is started (Step S13) and ejection of ink from the plurality of outlets 231 in the head 21 is controlled in synchronization with movement of the printing paper 9 (Step S14).

Assuming halftoning of an original image with the maximum gray level, if a ratio of the number of dots (i.e., the number of pixels to which the value representing ON of ejection of ink is assigned) in the halftone image not including the sleep pixels generated with use of the threshold matrix (the basic matrix 82) not including the sleep elements relative to the number of all the pixels, is 100% (the ratio is hereinafter referred to as "pixel recording rate"), the pixel recording rate in the halftone image including the sleep pixels generated with use of the threshold matrix 81 including the sleep elements, is 66.6% (2/3) and a density (e.g., average density) in the halftone image including the sleep pixels is 2/3 times that of the halftone image not including the sleep pixels.

For this reason, in a case that the outlets of the sleep state are set with the threshold matrix 81 including the sleep elements in printing, a voltage (driving voltage) which is inputted to the piezoelectric element provided in each outlet 231 is changed from a voltage in the case that the outlets of the sleep state are not set, and an ink ejection volume from each of outlets 231 (other than the outlets brought into the sleep state) is thereby increased 3/2 times an ink ejection volume in the case that the outlets of the sleep state are not set (the ink ejection volume in the case that the outlets of the sleep state are not set is hereinafter, referred to as "normal ejection volume"). Thus, a density of an image (printed image) which is actually printed on the printing paper 9 is almost 3/2 times greater than that in the case where printing is performed at the normal ejection volume and the density of the image becomes almost equal to that of a printed image in the case that the threshold matrix not including the sleep elements is used (i.e., the printed image is an image printed at the normal ejection volume without setting the outlets of the sleep state). After the whole halftone image is printed on the printing paper 9, movement of the printing paper 9 is stopped to complete the printing operation in the printer 1 (Step S15).

As discussed above, when the outlets of the sleep state are set in printing by using the threshold matrix 81 including the sleep elements in the printer 1, an ink ejection volume from each of the outlets other than the outlets of the sleep state is increased as compared to the case where the outlets of the sleep state are not set. As a result, it is possible to increase the density of the printed image while suppressing occurrence of unevenness by the cross talk between the outlets. Since an increasing rate of the ink ejection volume relative to the normal ejection volume is made to a reciprocal of the pixel recording rate in the threshold matrix 81 including the sleep elements, it is possible to approximate the density in the printed image to the case where the outlets of the sleep state are not set.

The increasing rate of the ink ejection volume relative to the normal ejection volume may be made to a value approximating to a reciprocal of the pixel recording rate in the threshold matrix 81 including the sleep elements. In this way, the increasing rate of the ejection volume is determined on the basis of the pixel recording rate depending on the construction of the mask matrix, to thereby control the density in the printed image appropriately.

An increase of the density in the printed image may be achieved by changing values (threshold values) of elements other than the sleep elements in the threshold matrix 81 including the sleep elements. Specifically, in a case where the threshold matrix 81 is generated by applying the mask matrixes 61 of FIG. 10 to the basic matrix 82, a value of each of elements excluding the sleep elements in the threshold matrix 81 is multiplied by the pixel recording rate (2/3) in the threshold matrix 81 (the pixel recording rate (2/3) is used as a modification coefficient) to acquire a threshold matrix where the values of the elements are made smaller (the threshold matrix is hereinafter referred to as a "modified threshold matrix").

As discussed earlier, in generation of the halftone image, the original image is compared with the threshold matrix, a dot is set at each position where a pixel value in the original image is larger than the threshold values of the elements of the threshold matrix corresponding to the pixel value, and a dot is not set at each of remaining pixels. Therefore, the number of dots in a halftone image generated by using the modified threshold matrix is larger than that in the halftone image generated by using the threshold matrix 81 before being multiplied by the modification coefficient and thereby, a density in the halftone image generated by using the modified threshold matrix is increased.

Actually, in the case that a halftone image is generated by halftoning an original image with a uniform gray level with using the threshold matrix 81, the number of dots in the halftone image is proportional to the gray level of the original image and therefore, in the relationship between the number of dots and the gray level, multiplying a value of each element in the threshold matrix 81 by 2/3 is equivalent to multiplying a value of each pixel in the original image by 3/2. Therefore, the number of dots in a halftone image acquired by halftoning an original image with a certain gray level (a gray level included in a lower or middle grayscale range) with using the modified threshold matrix is the same as the number of dots in a halftone image acquired by halftoning an original image with a gray level, which is 3/2 times the uniform gray level, with using the threshold matrix 81 before being multiplied by the modification coefficient (2/3). In other words, with respect to the original image with a certain gray level, the number of dots in the halftone image generated from the modified threshold matrix is 3/2 times the number of dots in a halftone image generated from the threshold matrix 81 before being multiplied by the modification coefficient. As a result, a density of the halftone image generated with the modified threshold matrix is almost equal to that of the halftone image generated with the threshold matrix not including the sleep elements.

Accurately, in the relationship in the modified threshold matrix between the gray level of the original image and the number of dots in the halftone image, the number of dots is increased in proportion to increase of the gray level in the lower or middle grayscale range, the ratio of the number of dots relative to the number of all the pixels in the gray level corresponding to 2/3 of the whole grayscale range of the original image becomes the pixel recording rate (66.6%) in the threshold matrix 81, and the number of dots is not increased in a grayscale range higher than the gray level, because of existence of the sleep elements. However, by applying the modified threshold matrix to an original image not including a lot of high gray levels (large pixel values), the density of the halftone image can be almost equal to the case where the threshold matrix not including the sleep elements is used.

Naturally, depending on a range of pixel values included in an original image, a value which is larger than the pixel recording rate in the threshold matrix 81 and is smaller than 1 is used as the modification coefficient, and a gray level where the ratio of the number of dots relative to the number of all the pixels reaches the pixel recording rate may be higher than the case where the modification coefficient is the pixel recording rate, while making the density of the halftone image generated with the modified threshold matrix close to the density of the halftone image generated with the threshold matrix not including the sleep elements.

There may be a case where a value (pixel value) of each pixel in the original image is multiplied by a reciprocal of the pixel recording rate (2/3) in the threshold matrix 81 (the reciprocal is used as the modification coefficient) to achieve increase of a density of a printed image (in a case where a value of a pixel becomes equal to or larger than the maximum pixel value representing the maximum gray level of the original image, the value of the pixel is made to the maximum pixel value). As described earlier, in the case that a halftone image is generated by halftoning the original image with a certain gray level with using the threshold matrix 81, the number of dots in the halftone image is proportional to the gray level of the original image and multiplying a value of each pixel in the original image by ½ is equivalent to multiplying a value of each element in the threshold matrix 81 by ⅔ in the relationship between the number of dots and the gray level. Therefore, a density of a halftone image generated from an image where a value of each pixel in the original image is multiplied by the modification coefficient and the threshold matrix 81 including the sleep elements, is almost equal to that of the halftone image generated from the original image before being multiplied by the modification coefficient and the threshold matrix not including the sleep elements.

Also in the case that a value of each pixel in the original image is multiplied by the modification coefficient, a value which is smaller than the reciprocal of the pixel recording rate in the threshold matrix 81 and is larger than 1 may be used as the modification coefficient depending on a range of pixel values included in the original image, and in this case, it is also possible to make the density of the halftone image generated from the image where a value of each pixel in the original image is multiplied by the modification coefficient and the threshold matrix 81 including the sleep elements, close to that of the halftone image generated from the original image before being multiplied by the modification coefficient and the threshold matrix not including the sleep elements.

As discussed above, in the printer 1, values of elements excluding the sleep elements in the threshold matrix or values of pixels in the original image are changed so that the density of the halftone image generated with the threshold matrix including the sleep elements is getting close to that of the halftone image generated with the threshold matrix not including the sleep elements. With this operation, it is possible to make a density of a printed image close to that of a printed image generated with the threshold matrix not including the sleep elements, while suppressing occurrence of unevenness by the cross talk between the outlets. Also, change of values of elements excluding the sleep elements in the threshold matrix including the sleep elements or change of values of pixels in the original image is performed with use of the modification coefficient based on the pixel recording rate and thereby, it is possible to approximate the density of the printed image (or the halftone image) to that of the printed image generated with the threshold matrix not including the sleep elements.

Naturally, the above technique for increasing an ink ejection volume from each outlet, the technique for changing a value of each element in the threshold matrix including the sleep elements, and the technique for changing a value of each pixel in the original image can be used in printing using another threshold matrix including the sleep elements, as well as the threshold matrix 81 of FIG. 11. For example, in a threshold matrix corresponding to the outlet row 23 shown in FIG. 14A (the outlet row 23 may be one in FIG. 14B or later-discussed FIG. 16A, 16B, or the like), the pixel recording rate is ⅘ and in this case, the increasing rate relative to the normal ejection volume in increasing an ink ejection volume is made to 5/4, the modification coefficient in changing values of elements excluding the sleep elements in the threshold matrix including the sleep elements is made to ⅘, and the modification coefficient in changing values of pixels in the original image is made to 5/4.

Although, in the above operation example, one outlet 231 brought into the sleep state is positioned at a regular interval in the outlet row 23, the arrangement of the outlets 231 brought into the sleep state may be changed in the outlet row 23 in various manners. For example, in an outlet row 23 shown in FIG. 16A, one outlet 231*a* is the sleep state, adjacent two outlets 231 on the (+X) side of the outlet 231*a* are the active state (in FIG. 16A, the two outlets 231 are treated as the active outlet group shown by the reference sign 230*a*), an adjacent outlet 231*b* on the (+X) side of the active outlet group 230*a* is the sleep state, and adjacent three outlets 231 on the (+X) side of the outlet 231*b* are the active state (in FIG. 16A, the three outlets 231 are treated as the active outlet group shown by the reference sign 230*b*).

Figure 16A:
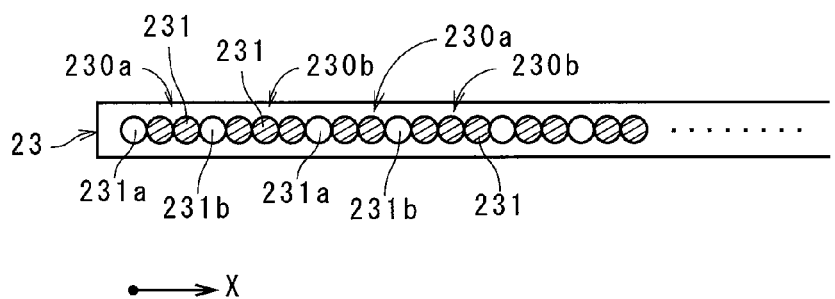
FIGS. 16A and 16B are views each showing an outlet row.
Figure 16B:
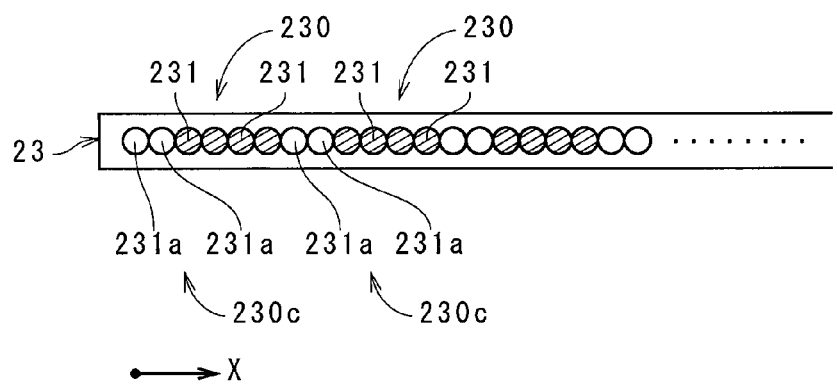

In an outlet row 23 shown in FIG. 16B, two outlets 231*a* which are continuously arranged in the width direction are brought into the sleep state (hereinafter, outlets which are brought into the sleep state continuously in the width direction are referred to as a "sleep outlet group" and the sleep outlet group is shown by the reference sign 230*c* in FIG. 16B), and continuous three outlets 231 adjacent to the sleep outlet group 230*c* are an active outlet group 230.

As discussed above, the arrangement of the outlets 231 which are brought into the sleep state in the outlet row 23 can be variously changed. In a generating process of a mask matrix shown in FIG. 15, a halftone test image corresponding to the outlet row 23 shown in FIG. 16A and a halftone test image corresponding to the outlet row 23 shown in FIG. 16B may be used and in this case, ejection control of 2ON1OFF3ON1OFF is performed in printing the halftone test image corresponding to the outlet row 23 shown in FIG. 16A, and ejection control of 4ON2OFF is performed in printing the halftone test image corresponding to the outlet row 23 shown in FIG. 16B.

If the number of outlets 231 which are not brought into the sleep state continuously in the width direction is more than a predetermined number (e.g., ten), unevenness by the cross talk between the outlets 231 are outstanding in a printed image and if the number of outlets 231 which are brought into the sleep state continuously in the width direction is more than a predetermined number (e.g., three), a part of the halftone image corresponding to the sleep pixels tends to be easily recognized in a printed image to decrease the quality of the printed image. Therefore, from the view point of easily suppressing occurrence of unevenness in a printed image caused by the cross talk between the outlets 231, while reducing degradation (decrease of the quality) of the image, it is important that while printing is performed, the number of outlets 231 included in each sleep outlet group which is brought into the sleep state continuously in the width direction is made to be equal to or larger than 1 and equal to or smaller than a predetermined number (preferably, three) in the outlet row 23, and the number of outlets 231 included in each active outlet group which is not brought into the sleep state continuously in the width direction is made to be equal to or larger than 1 and equal to or smaller than a predetermined number (preferably, ten) in the outlet row 23. In addition, the outlet row 23 (each outlet row in a printer described later) consists of sleep outlet groups and active outlet groups, and sleep outlet groups and active outlet groups are changed in sequence while printing is performed.

Figure 17:
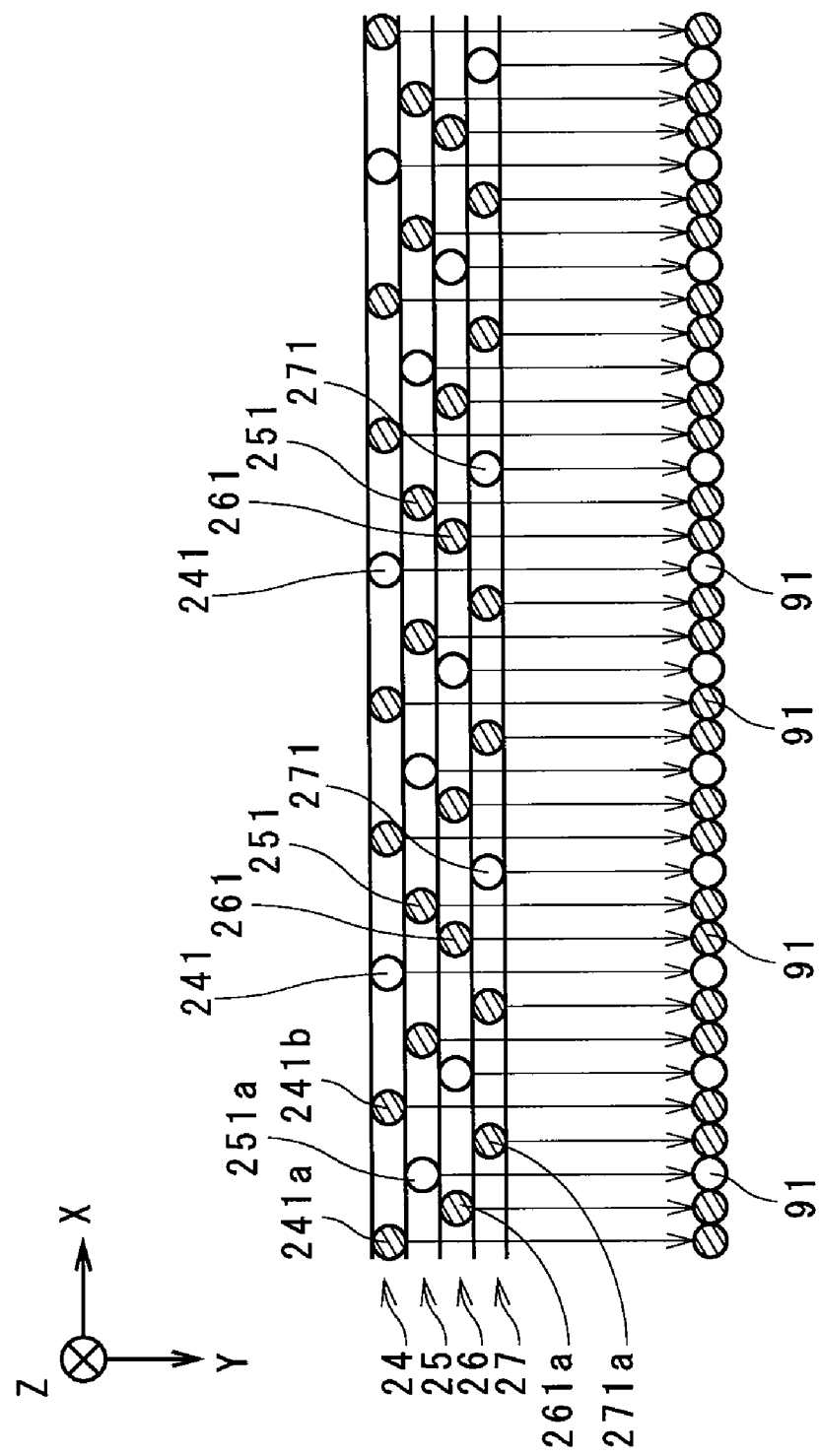
FIG. 17 is a view for explaining an arrangement of outlets.

A plurality of outlet rows may be arranged in the scan direction in each module ejecting ink of one color in the head 21. FIG. 17 is a view for explaining an arrangement of outlets in one module in the head 21. The upper part of FIG. 17 shows outlets 241, 251, 261, 271 included in the module and the lower part of FIG. 17 shows dots 91 formed on the printing paper 9 by the outlets 241, 251, 261, 271 (dots are virtually shown also in the case that the dots are not actually formed).

As shown in the upper part of FIG. 17, four outlet rows 24, 25, 26, 27 are arranged in the scan direction (the Y direction in FIG. 17) in each module of the head 21, and the outlets 241, 251, 261 or 271 are arranged at the same pitch in the width direction (the X direction in FIG. 17) in respective outlet rows 24 to 27. Looking at the width direction, three outlets in respective three outlet rows are positioned between adjacent two outlets in the width direction in the remaining outlet row. For example, one outlet 251a included in the second outlet row 25 from the (−Y) side is positioned at the central position between an outlet 241a and an outlet 241b in the outlet row 24 at the end on the (−Y) side in the upper part of FIG. 17, one outlet 261a included in the third outlet row 26 from the (−Y) side is positioned at the central position between the outlet 241a and the outlet 251a, and one outlet 271a included in the outlet row 27 at the end on the (+Y) side is positioned at the central position between the outlet 251a and the outlet 241b. Therefore, a large number of outlets 241, 251, 261, 271 are arranged at a regular pitch (accurately, a pitch of ¼ of the outlet pitch in each of the outlet rows 24 to 27) in the width direction in the whole head 21, and a plurality of dots 91 arranged in the width direction in a line can be formed in each of positions in the scan direction on the printing paper 9, as shown in the lower part of FIG. 17.

In this case, if ejection control of ink from each outlet 241, 251, 261 or 271 in the head 21 is performed on the basis of the data of the halftone image acquired by comparing the threshold matrix 81 of FIG. 11 with the original image 70, in writing of a part of the halftone image corresponding to a certain position in the scan direction on the printing paper 9, every third outlet (i.e., blank outlets in the upper part of FIG. 17) in a plurality of outlets 241, 261, 251, 271 arranged with respect to the width direction in a plurality of outlet rows 24 to 27 (i.e., a plurality of outlets which respectively correspond to the plurality of dots 91 arranged in the width direction in a line on the printing paper 9) is brought into the sleep state and ejection control of ink is performed in the other outlets (i.e., outlets brought into the active state and the outlets are shown by hatching in the upper part of FIG. 17) in accordance with the comparison results between the original image 70 and the threshold matrix 81. In the lower part of FIG. 17, the dots 91 formed on the printing paper 9 correspondingly to the outlets 241, 251, 261, 271 brought into the active state, are shown by hatching (the same is applied in FIGS. 19 and 20 discussed later).

In this time, every third outlet 241, 251, 261, 271 is brought into the sleep state also in each of the outlet rows 24 to 27. Therefore, it is possible to surely prevent ejection operation of ink from being concurrently performed in a larger number of continuous outlets 241, 251, 261, 271 in each of the outlet rows 24 to 27, and to reduce the cross talk between adjacent outlets affecting one another. As a result, it is possible to easily suppress occurrence of unevenness in a printed image, caused by the cross talk between the outlets.

Figure 18:
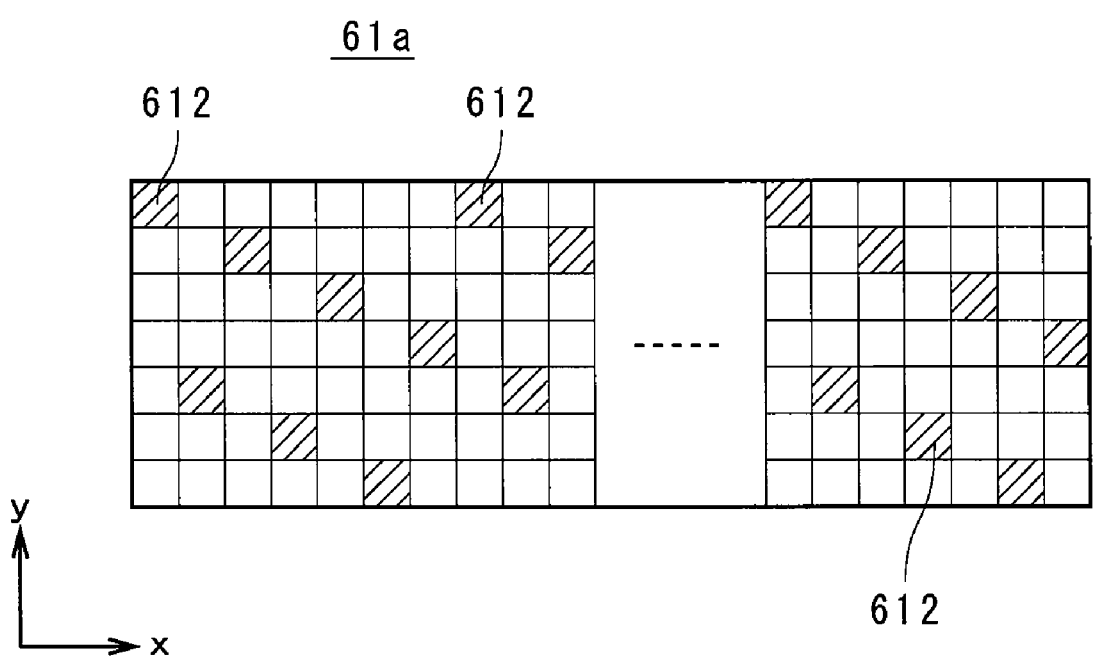
FIG. 18 is a view showing another example of the mask matrix.
Figure 19:
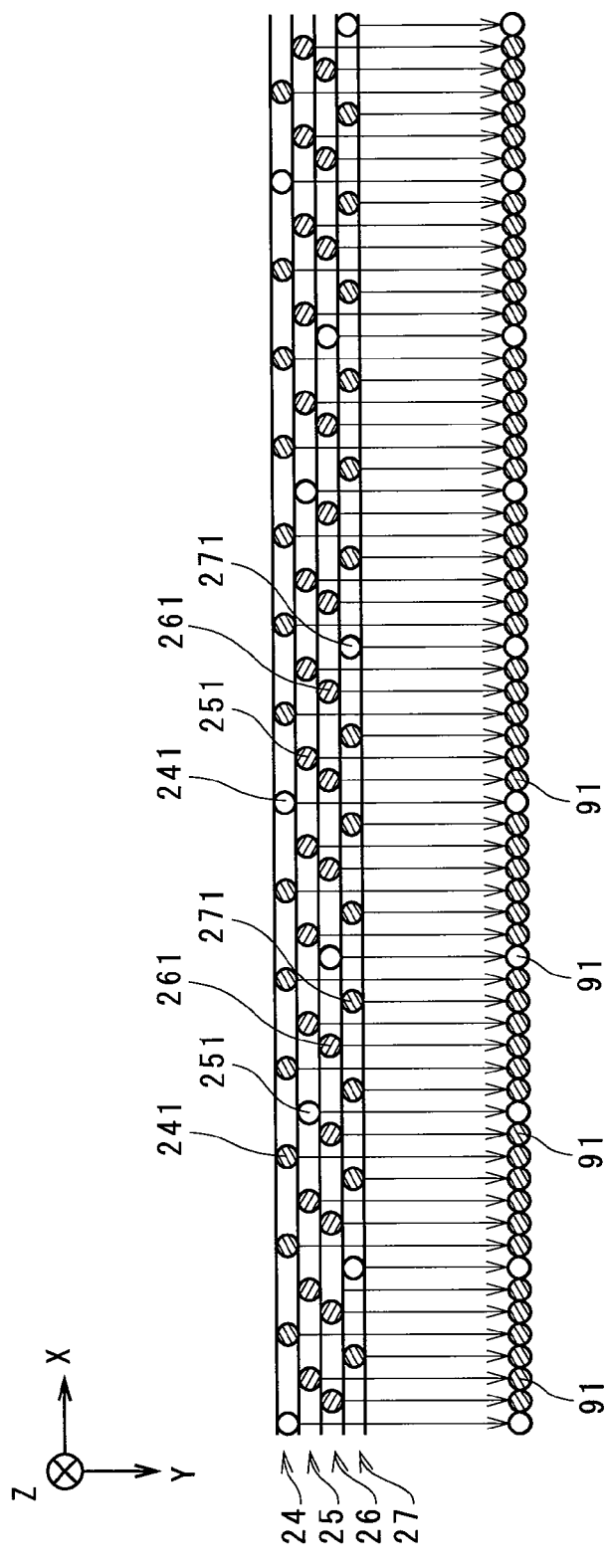
FIGS. 19 and 20 are views each showing outlet rows.

In the printer 1 having the four outlet rows 24 to 27 arranged in the scan direction, in a case that a mask matrix 61a where a mask element 612 exists in every seventh position of each row is prepared as shown in FIG. 18, the basic matrix is tiled with the mask matrixes 61a to generate a threshold matrix where a sleep element exists in every seventh position of each element row. When a part of a halftone image corresponding to a certain position in the scan direction on the printing paper 9 is written in printing of the halftone image generated by comparing the threshold matrix and the original image 70, every seventh outlet 241, 251, 261, 271 (i.e., blank outlets in the upper part of FIG. 19) in each of the outlet rows 24 to 26 is brought into the sleep state as shown in the upper part of FIG. 19, and ejection control of ink is performed in the other outlets 241, 251, 261, 271 (i.e., the outlets shown by hatching in the upper part of FIG. 19) in accordance with the comparison results between the original image 70 and the threshold matrix. With this operation, it is possible to easily suppress occurrence of unevenness in a printed image, caused by the cross talk between the outlets.

Figure 20:
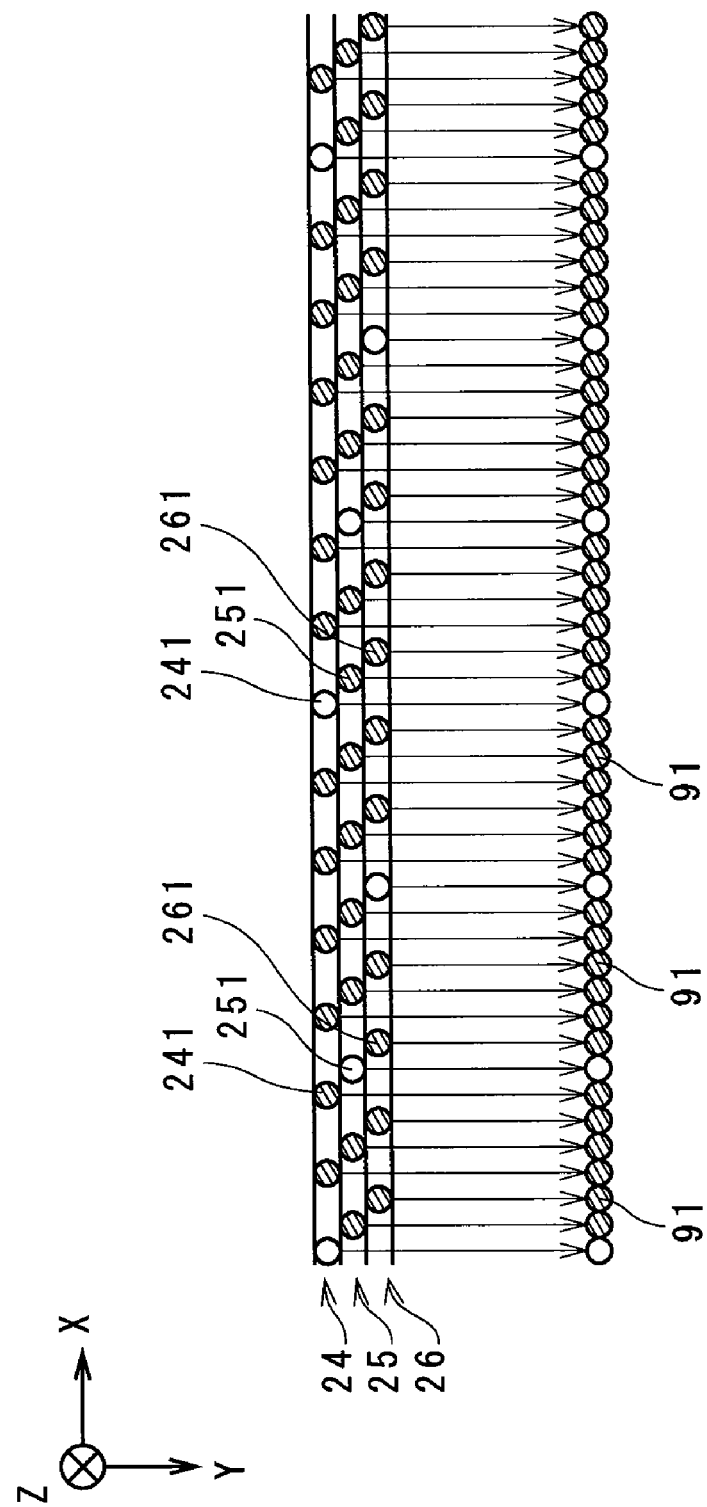

Further, three outlet rows 24 to 26 may be arranged in the scan direction (the Y direction in FIG. 20) in each module of the head 21 as shown in the upper part of FIG. 20. In this case, one outlet 251 included in the second outlet row 25 from the (−Y) side is disposed at a position which is away from a certain outlet 241 in the outlet row 24 at the end on the (−Y) side by ⅓ times the outlet pitch on the (+X) side, one outlet 261 included in the outlet row 26 at the end on the (+Y) side is disposed at a position which is away from the outlet 241 by ⅔ times the outlet pitch on the (+X) side, and a large number of outlets 241, 251, 261 are arranged at a regular pitch (accurately, a pitch of ⅓ times the outlet pitch) in the width direction in the whole head 21.

In the printer 1 having such a head 21, when a part of a halftone image corresponding to a certain position in the scan direction on the printing paper 9 is written in printing of the halftone image generated by comparing the threshold matrix derived from the mask matrixes 61a of FIG. 18 and the original image 70, every seventh outlet 241, 251, 261 (i.e., blank outlets in the upper part of FIG. 20) in each of the outlet rows 24 to 26 is brought into the sleep state as shown in the upper part of FIG. 20, and ejection control of ink is performed in the other outlets 241, 251, 261 (i.e., the outlets shown by hatching in the upper part of FIG. 20) in accordance with the comparison results between the original image 70 and the threshold matrix. With this operation, it is possible to easily suppress occurrence of unevenness in a printed image, caused by the cross talk between the outlets.

Naturally, in the printer 1 having a plurality of outlet rows, a density in a printed image may be increased by increasing an ink ejection volume from each of the outlets other than the outlets of the sleep state in each outlet row, changing values of elements in the threshold matrix including the sleep elements, or changing values of pixels in the original image.

Also, in the printer 1 having a plurality of outlet rows in each module, if the number of outlets brought into the sleep state continuously in the width direction in each outlet row is more than the predetermined number, many positions at which dots are not forcefully formed exist in a narrow range in a printed image and there is a possibility that a region including the positions are recognized as unevenness. For this reason, in such a printer 1, it is preferable the number of outlets included in each sleep outlet group which is brought into the sleep state continuously in the width direction is made to be equal to or larger than 1 and equal to or smaller than the predetermined number, in order to reduce degradation of a printed image.

As discussed above, in the printer 1 having one or more outlet rows arranged in the scan direction, each of the one or more outlet rows including a plurality of outlets arranged in the width direction, data of a halftone image where while printing is performed, the number of outlets included in each sleep outlet group which is brought into the sleep state continuously in the width direction is made to be equal to or larger than 1 and equal to or smaller than the predetermined number in each of the one or more outlet rows and the number of outlets included in each active outlet group which is not brought into the sleep state continuously in the width direction is made to be equal to or larger than 1 and equal to or smaller than the predetermined number in each of the one or more outlet rows, is generated to thereby easily suppress occurrence of unevenness in a printed image caused by the cross talk between the outlets, while reducing degradation of the image.

In the printer 1 where each module has M outlet rows, in a case where the sleep elements exist at an interval of distance of L elements in each element row in the threshold matrix (M and L are positive integers) and the greatest common divisor between L and M is a value other than 1, intervals in the width direction of the outlets brought into the sleep state in respective outlet rows are different among the plurality of outlet rows or no outlet brought into the sleep state exist in some outlet rows. Therefore, in order to set the outlets brought into the sleep state in the plurality of outlet rows at the same interval, the number of outlet rows M and the number of elements L corresponding to the pitch of the sleep elements in each element row in the threshold matrix should be coprime to each other.

Figure 21:
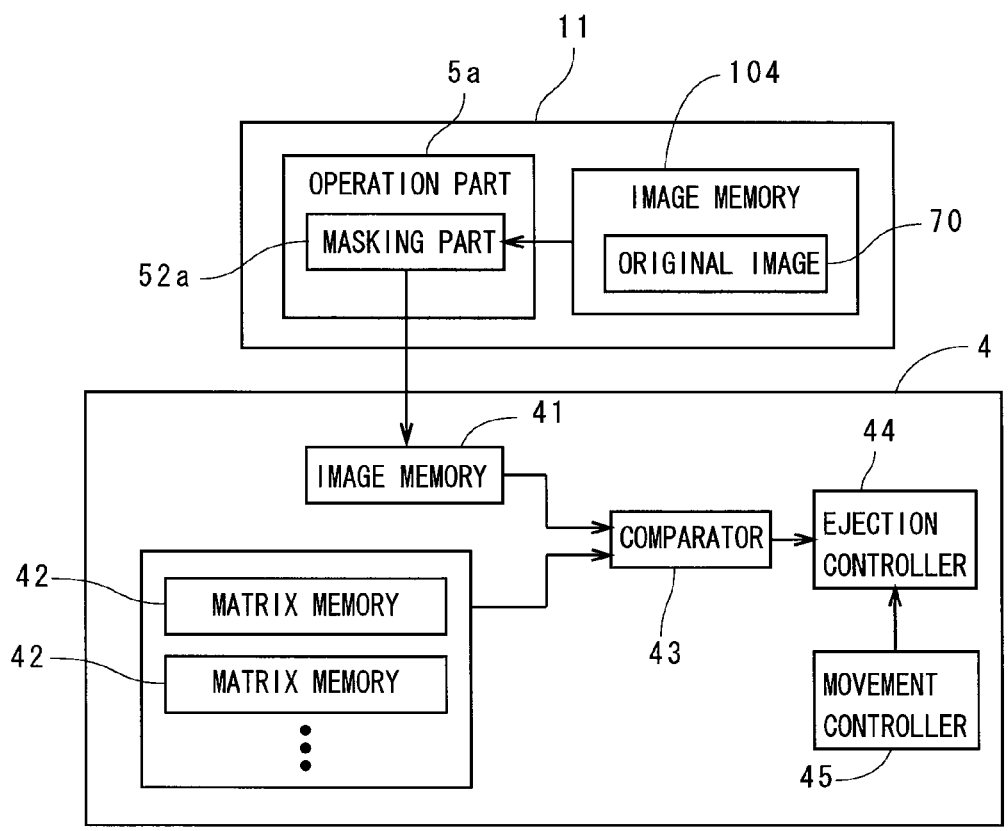
FIG. 21 is a block diagram showing a part of a functional constitution of a printer in accordance with the second preferred embodiment.

FIG. 21 is a block diagram showing a part of a functional constitution of a printer 1 in accordance with the second preferred embodiment. In the printer 1 according to the present preferred embodiment, the computer 11 of FIG. 3 executes the program 900 to achieve a function of an operation part 5*a* which makes the sleep pixels included in the original image 70. The functional constitutions in the main body control part 4 are the same as those in FIG. 4 and represented by the same reference signs.

Figure 22:
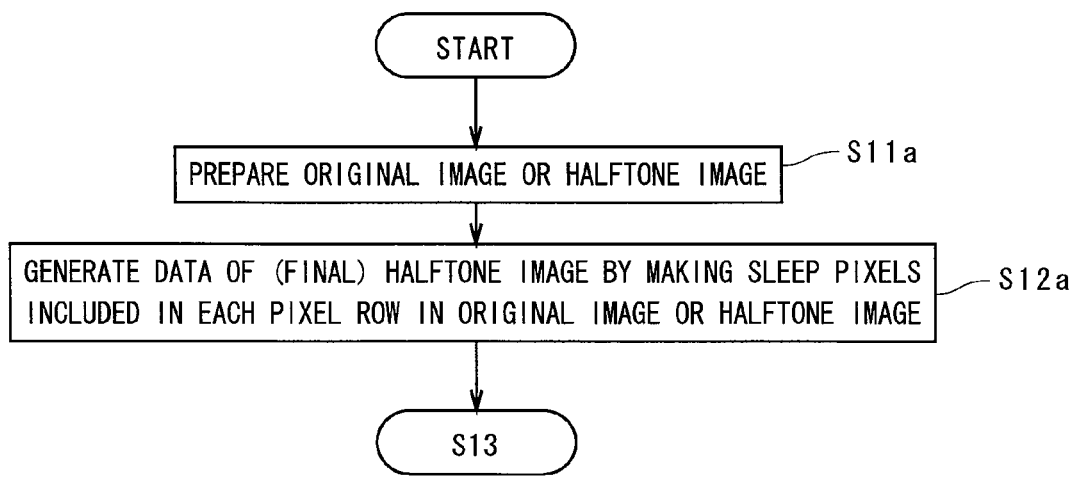
FIG. 22 is a flowchart showing a part of an operation flow for printing in the printer.

FIG. 22 is a flowchart showing a part of an operation flow for printing in the printer 1 and shows processes performed instead of Steps S1, S12 of FIG. 5. In the printer 1, (data of) an original image 70 is stored (may be stored in advance) and prepared in an image memory 104 in the computer 11 (Step S11*a*). Step S11*a* of FIG. 22 also shows the contents of a process in a later-discussed operation example (the same is applied in Step S12*a*).

Figure 23:
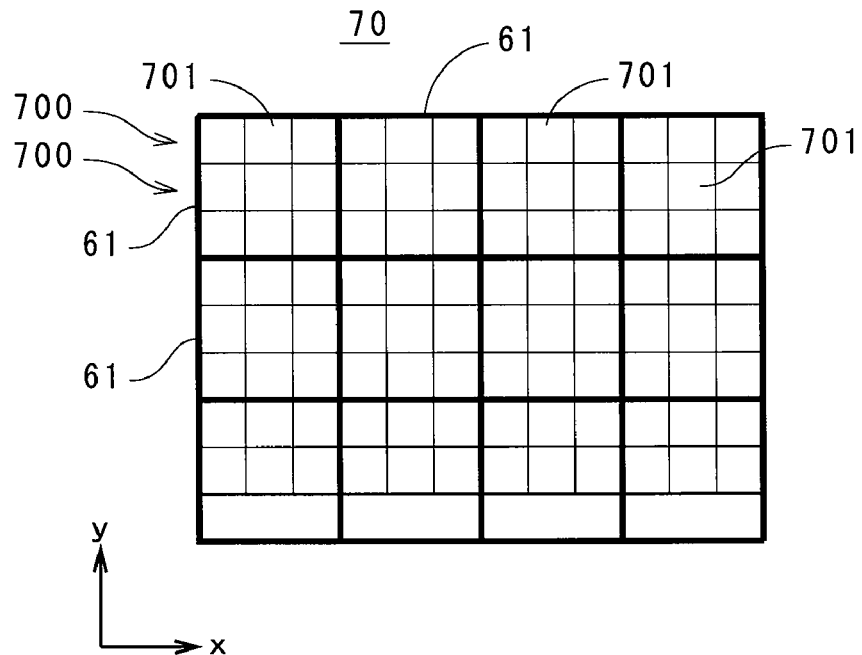
FIG. 23 is a view showing an original image.

FIG. 23 is a view showing the original image 70. As described earlier, the original image 70 has an array of a large number of pixels 701 in the row direction corresponding to the width direction (the row direction is shown as the x direction in FIG. 23) and the column direction corresponding to the scan direction (the column direction is shown as the y direction in FIG. 23). In FIG. 23, the size of the original image 70 is smaller than it is, for convenience of illustration. Subsequently, the original image 70 is outputted to a masking part 52*a* and the original image 70 is tiled with the mask matrixes 61 shown in FIG. 10. In FIG. 23, each outer form of the mask matrixes 61 which are overlapped is shown by a thick-line rectangle, and positions in the tiled mask matrixes 61, where pixels 701 in the original image 70 corresponding to the positions do not exist, are ignored (i.e., the row on the (−y) side of the mask matrixes 61 at the end on the (−y) side in FIG. 23 are ignored). Then, pixels 701 in the original image 70 which are overlapped with the mask elements 612 are replaced with sleep pixels. The sleep pixel in the original image 70 is a pixel for assigning a value representing sleep (OFF) of ejection of ink to a position (pixel) in the halftone image corresponding to the sleep pixel in generation of (the data) of the halftone image which is discussed earlier, and the sleep pixel in the present preferred embodiment is a pixel whose pixel value is a value representing the minimum gray level in the whole grayscale range of the original image (or the pixel value is the minimum value of the threshold values in the threshold matrix).

Figure 24:
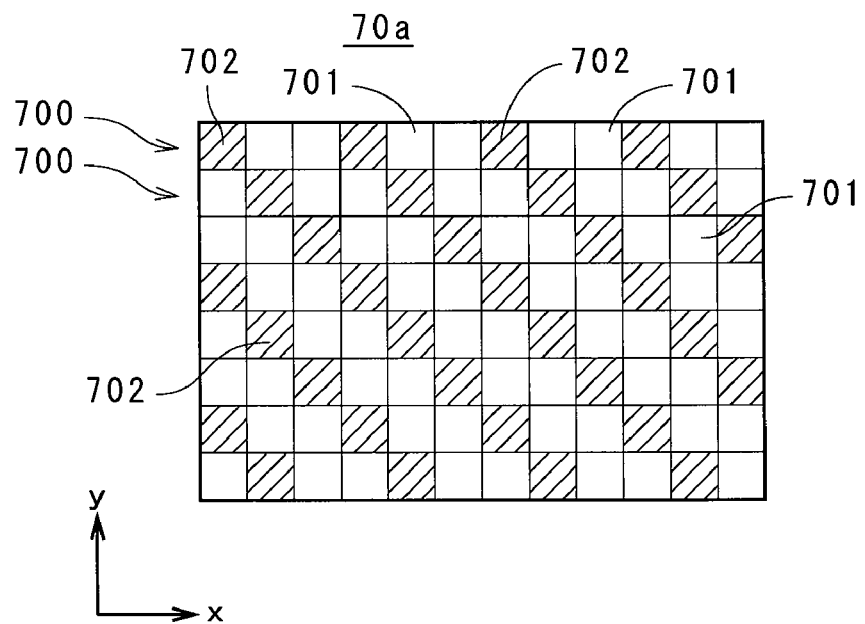
FIG. 24 is a view showing a final original image.

In this manner, pixels 701 in the original image 70 which are overlapped with the mask elements 612 are changed to the sleep pixels to generate an original image 70*a* (hereinafter, also referred to as "final original image 70*a*") where every third pixel (shown by hatching in FIG. 24) is made to a sleep pixel 702 in each of pixel rows 700 each of which is a plurality of pixels arranged in the row direction, as shown in FIG. 24. The final original image 70*a* is outputted and stored in the image memory 41 of the main body control part 4. In the preferred embodiment, the basic matrix 82 of FIG. 9 (i.e., the matrix not including the sleep elements) is stored in the matrix memory 42 as a threshold matrix. The final original image 70*a* is compared with the threshold matrix in the comparator 43 to generate data of a halftone image (Step S12*a*).

As discussed earlier, in generation of the halftone image, only when a pixel value of a pixel in the original image is larger than the threshold value of the element of the threshold matrix corresponding to the pixel value, a value representing ON of ejection of ink is assigned to the position in the halftone image corresponding to the pixel. Therefore, each of the pixel values of the sleep pixels 702 in the original image 70*a* is the value representing the minimum gray level in the original image and thereby, a pixel value representing OFF of ejection of ink is certainly assigned to each of positions in the halftone image corresponding to the sleep pixels 702. As discussed above, each of the pixels in the halftone image corresponding to the sleep pixels 702 in the final original image 70*a* is treated as a sleep pixel (in the halftone image) representing OFF of ejection of ink, and also in the halftone image, the sleep pixel is disposed in every third position in each of the pixel rows each of which is the plurality of pixels arranged in the row direction.

The threshold matrix (the basic matrix) where the number of elements in the row direction is the same as the number of pixels in the row direction in the original image is not necessarily used in generation of the halftone image in the printer 1, but for example, threshold arrangements where the number of elements in the row direction is smaller than that in the original image may be used as the threshold matrix (the same is applied in the third preferred embodiment discussed later). In this case, a pixel value of each pixel in the original image is compared with a threshold value of an element of the threshold matrix corresponding to the pixel value with tiling the original image with the threshold matrix (the threshold arrangements), to generate a halftone image.

In the printer 1, ejection of ink from the plurality of outlets included in each module in the head 21 is controlled by the ejection controller 44 on the basis of the data of the halftone image, in synchronization with movement of the printing paper 9 (FIG. 5: Steps S13, S14). With this operation, in the case that the printer 1 has only one outlet row 23 (see FIG. 2), every third outlet 231*a* in the outlet row 23 is brought into the sleep state as shown in FIGS. 12A and 12B and the other outlets 231 are brought into the active state. In the case that the printer 1 has the plurality of outlet rows 24 to 27, every third outlet 241, 251, 261, 271 in each of the outlet rows 24 to 27 is brought into the sleep state as shown in the upper part of FIG. 17 and the other outlets 241, 251, 261, 271 are brought into the active state. After the whole halftone image is printed on the printing paper 9, movement of the printing paper 9 is stopped to complete the printing operation in the printer 1 (Step S15).

As discussed above, in the printer 1, after the operation part 5*a* which is an image data generator and the main body control part 4 make the sleep pixels 702 representing sleep of ejection of ink, included in each of the pixel rows in the original image 70, the final original image 70*a* is compared with the threshold matrix, to thereby generate data of a final halftone image where while printing is performed, the number of outlets included in each sleep outlet group which is brought into the sleep state continuously in the width direction is made to be equal to or larger than 1 and equal to or smaller than a predetermined number in each of one or more outlet rows, and the number of outlets included in each active outlet group which is not brought into the sleep state continuously in the width direction is made to be equal to or larger than 1 and equal to or smaller than a predetermined number in each of the one or more outlet rows. As a result, it is possible to easily suppress occurrence of unevenness in a printed image caused by the cross talk between the outlets, while reducing degradation of the image. Since the sleep pixels 702 included in the original image 70 are not continuously positioned in the column direction corresponding to the scan direction, it is possible to suppress blockage of the outlets by drying of the ink in the vicinities of the outlets in printing.

Also in the present preferred embodiment, there may be a case where a plurality of halftone test images where the positions of the sleep pixels are different from one another are printed on the printing paper 9 (FIG. 15: Step S31), and a halftone test image which satisfies a predetermined condition, out of the plurality of halftone test images printed on the printing paper 9, is specified to generate a mask matrix used in generation of the final original image 70*a* (Step S32). As described, since the positions of the sleep elements included in the original image 70 are determined on the basis of the plurality of halftone test images printed on the printing paper 9, it is possible to generate preferable data of a halftone image which is capable of suppressing occurrence of unevenness by the cross talk between the outlets (the same is applied in the third preferred embodiment discussed later).

In the second preferred embodiment, a density of a printed image may be increased by increasing an ink ejection volume from each of the outlets other than the outlets of the sleep state in each outlet row, similarly to the first preferred embodiment. By changing values of pixels excluding the sleep pixels in the original image including the sleep pixels or changing values of elements in the threshold matrix compared with the original image, a density of the final halftone image may be close to a density of a halftone image generated in the case that the sleep pixels are not made to be included in the original image (i.e., a halftone image which is generated from an original image not including the sleep pixels and not changing values, and a threshold matrix not changing values). As a result, it is possible to make a density of a printed image close to a density of a printed image in the case that the sleep pixels are not made to be included in the original image, while suppressing occurrence of unevenness by the cross talk between the outlets.

In this case, change of values of pixels excluding the sleep pixels in the original image including the sleep pixels or change of values of elements in the threshold matrix is performed with use of the modification coefficient based on the pixel recording rate in the original image including the sleep pixels (the pixel recording rate described here is the ratio of the number of dots relative to the number of all the pixels in the final halftone image which is acquired if the original image prepared in Step S11*a* is a uniform image with the maximum gray level) and thereby, it is possible to approximate the density of the printed image (or the halftone image) to the density of the printed image in the case that the sleep pixels are not made to be included in the original image.

Figure 25:
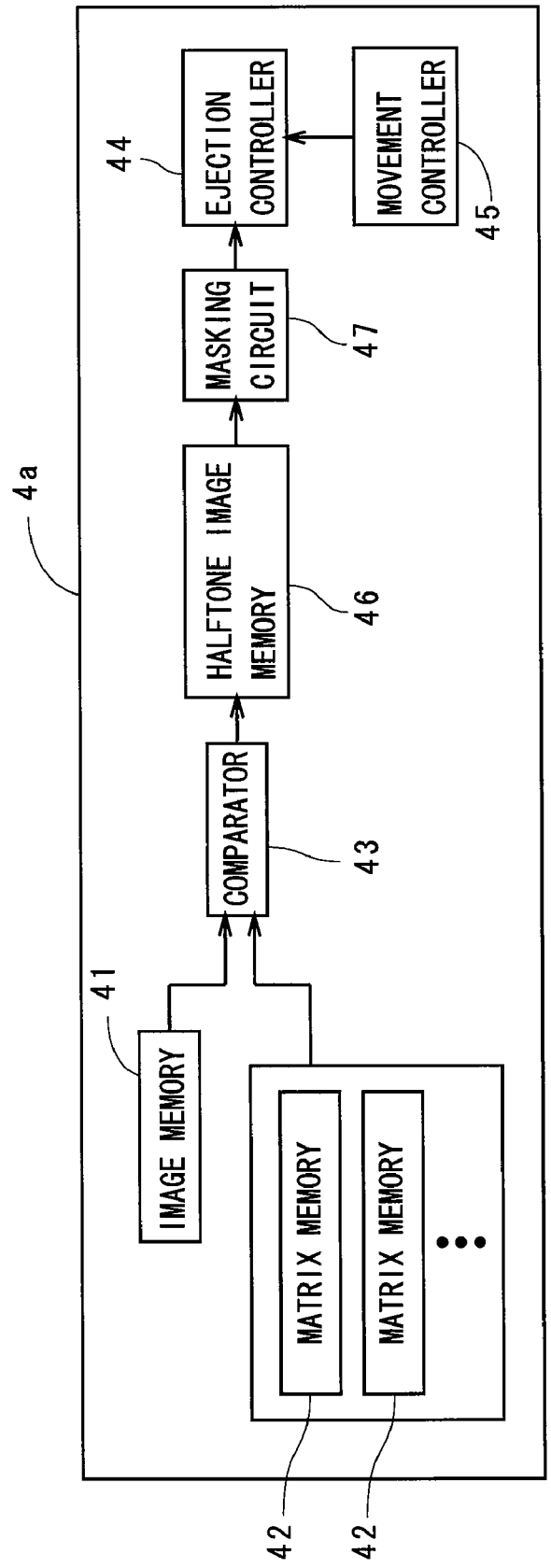
FIG. 25 is a block diagram showing a part of a functional constitution of a printer in accordance with the third preferred embodiment.

FIG. 25 is a block diagram showing a part of a functional constitution of a printer 1 in accordance with the third preferred embodiment and only shows functional constitutions in a main body control part 4*a*. The main body control part 4*a* in the preferred embodiment is different from the main body control part 4 of FIG. 4, in that a halftone image memory 46 for storing a halftone image and a masking circuit 47 which makes the sleep pixels included in a halftone image are provided between the comparator 43 and the ejection controller 44. The other functional constitutions in the main body control part 4*a* are the same as those in FIG. 4 and represented by the same reference signs.

Next discussion will be made on an operation flow for printing in the printer 1 with reference to FIGS. 5 and 22. In the preferred embodiment, similarly to the second preferred embodiment, the basic matrix 82 of FIG. 9 (i.e., the matrix not including the sleep elements) is stored in the matrix memory 42 as a threshold matrix, and an original image stored in the image memory 41 is compared with the threshold matrix in the comparator 43 to generate a halftone image, and the halftone image is stored and prepared in the halftone image memory 46 (Step S11*a*).

In the preferred embodiment, the halftone image memory 46 is actually a memory for temporally storing pixel values of a part of pixels in the halftone image (in this case, the halftone image memory 46 is also considered as a memory for substantially storing the halftone image), and the pixel values of the pixels in the halftone image are sequentially outputted to the masking circuit 47 from the halftone image memory 46, in parallel with generation of the halftone image in the comparator 43. A register included in the masking circuit 47 can be considered as the halftone image memory 46.

The halftone image is tiled with mask matrixes and each of pixel values of pixels in the halftone image which are overlapped with mask elements in the mask matrixes is converted into the value representing OFF of ejection of ink (i.e., the pixels are replaced with the sleep pixels). For example, when the mask matrix 61 shown in FIG. 10 is used, every third pixel in each pixel row in the halftone image is replaced with the sleep pixels. In this manner, pixels in the halftone image which are overlapped with the mask elements are changed to the sleep pixels, to easily generate data of a final halftone image which is image data used in the actual printing (Step S12*a*).

In the printer 1, ejection of ink from the plurality of outlets included in each module in the head 21 is controlled by the ejection controller 44 in accordance with the data of the halftone image, in synchronization with movement of the printing paper 9, and while printing is performed, every third outlet in each outlet row is brought into the sleep state and the other outlets are brought into the active state, to print an image on the printing paper 9 (FIG. 5: Steps S13 to S15).

As discussed above, in the printer 1, the masking circuit 47 which is an image data generator makes the sleep pixels representing sleep of ejection of ink, included in each of the pixel rows in the halftone image, to thereby generate data of a final halftone image where while printing is performed, the number of outlets included in each sleep outlet group which is brought into the sleep state continuously in the width direction is made to be equal to or larger than 1 and equal to or smaller than a predetermined number in each of one or more outlet rows, and the number of outlets included in each active outlet group which is not brought into the sleep state continuously in the width direction is made to be equal to or larger than 1 and equal to or smaller than a predetermined number in each of the one or more outlet rows. As a result, it is possible to easily suppress occurrence of unevenness in a printed image caused by the cross talk between the outlets, while reducing degradation of the image.

In the third preferred embodiment, a density of a printed image may be increased by increasing an ink ejection volume from each of the outlets other than the outlets of the sleep state in each outlet row, similarly to the first preferred embodiment. Values of pixels in the original image used in generation of the halftone image in Step S11*a* are changed from original values on the basis of the pixel recording rate in the halftone image including the sleep pixels (the pixel recording rate described here is the ratio of the number of dots relative to the number of all the pixels in the final halftone image which is acquired if dots are set at all the pixels in the halftone image prepared in Step S11a), and it is thereby possible to approximate a density of the final halftone image to a density of a halftone image not including the sleep pixels, the halftone image being generated with the original values of the pixels in the original image. Or, values of elements in the threshold matrix used in generation of the halftone image in Step S11a are changed from original values on the basis of the pixel recording rate, and it is thereby possible to approximate the density of the final halftone image to a density of a halftone image not including the sleep pixels, the halftone image being generated with the original values of the elements in the threshold matrix. As a result, it is possible to approximate a density of a printed image to that of a printed image in the case that printing is performed with use of data of a halftone image not including the sleep pixels, the halftone image being generated from the original values of the pixels in the original image and the original values of the elements in the threshold matrix, while suppressing occurrence of unevenness by the cross talk between the outlets.

Though the preferred embodiments of the present invention have been discussed above, the present invention is not limited to the above-discussed preferred embodiments, but allows various variations.

In the above first to third preferred embodiments, the sleep elements are made to be included in each of the element rows in the threshold matrix or the sleep pixels are made to be included in each of the pixel rows in the original image or the halftone image to generate the final halftone image including the sleep pixels in each pixel row (i.e., the halftone image used in the actual printing), and the outlets of the sleep state are set in each of one or more outlet rows in the head 21 when ejection control of ink from the head 21 is performed in parallel with relative movement of the printing paper 9 to the head 21. However, there may be a case where the data of the halftone image not including the sleep pixels is treated as image data used in the actual printing and ejection control of ink is performed while the ejection controller 44 forcibly sets the outlets of the sleep state in each outlet row in the head 21. Also in this case, the number of outlets included in each sleep outlet group which is brought into the sleep state continuously in the width direction is made to be equal to or larger than 1 and equal to or smaller than a predetermined number in each outlet row and the number of outlets included in each active outlet group which is not brought into the sleep state continuously in the width direction is made to be equal to or larger than 1 and equal to or smaller than a predetermined number in each outlet row. As a result, it is possible to easily suppress occurrence of unevenness in a printed image caused by the cross talk between the outlets, while reducing degradation of the image. Also in the case that the outlets of the sleep state are set in such a manner, it is preferable the ink ejection volume from each outlet is increased as compared to the case where the outlets of the sleep state are not set, to increase a density of a printed image.

Figure 26:
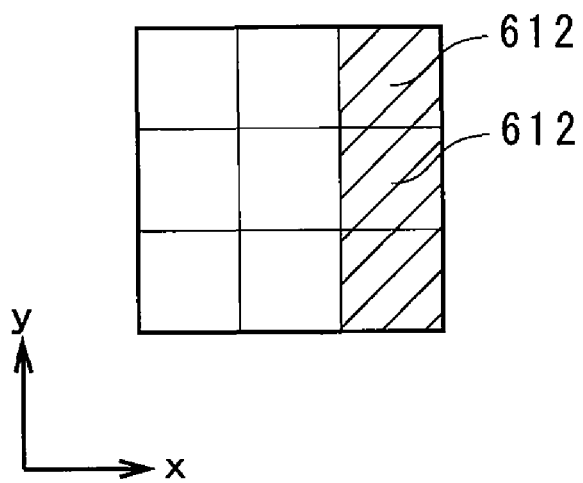
FIGS. 26 and 27 are views each showing still another example of the mask matrix.

In the printer 1, it is possible to use a mask matrix 61b where the mask elements 612 are arranged in the column direction (the y direction in FIG. 26) as shown in FIG. 26. However, if such a mask matrix 61b is used, there is a possibility the sleep pixels are continuously positioned in the column direction in the final halftone image used in the actual printing and outlets are blocked by drying of the ink in the vicinities of the outlets in printing. Therefore, in order to suppress degradation of a printed image printed on the printing paper 9 because of blocked outlets, it is preferable the mask elements 612 are not continuously positioned in the column direction like in the mask matrix 61 shown in FIG. 10 and the mask matrix 61a shown in FIG. 18.

Figure 27:
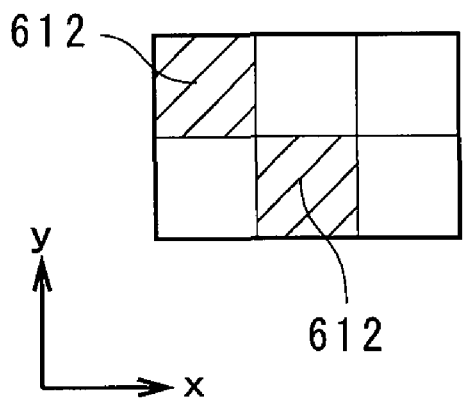

The mask elements 612 are not necessarily set in each column in the mask matrix, but a column where no mask element 612 exists may be set as shown in a mask matrix 61c of FIG. 27. In this case, though the outlets corresponding to the column are kept in the active state during printing, it is possible to suppress occurrence of unevenness in a printed image caused by the cross talk between the outlets, as long as the number of outlets included in each active outlet group which is not brought into the sleep state continuously in the width direction is made to be equal to or smaller than a predetermined number. There may be a case where the sleep elements or the sleep pixels are included in the threshold matrix, the original image, or the halftone image by using a plurality of kinds of mask matrixes having different positions of the mask elements or using mask matrixes in each of which the mask elements are randomly positioned (the number of mask elements in one row may be different that in another row).

The number of sleep elements included in each element row in the threshold matrix may be more than ½ of the number of elements included in the element row. For suppressing decrease of a density in a printed image, it is preferable the number of sleep elements in each element row is made to be equal to or smaller than ½ (more preferably, equal to or smaller than ⅓) of the number of elements included in the element row. Similarly, it is preferable the number of sleep pixels included in each pixel row in the original image or the halftone image is made to be equal to or smaller than ½ (more preferably, equal to or smaller than ⅓) of the number of pixels included in the pixel row. In this case, a relationship (A>B) is satisfied during printing, where A is the number of outlets brought into the active state in each outlet row and B is the number of outlets brought into the sleep state. The positions of the sleep elements or the sleep pixels which are set in the threshold matrix, the original image, or the halftone image may be different in each color component.

Although the outlets are arranged at a pitch corresponding to 180 dpi in each outlet row in the printer 1, actually, since adjacent outlets more greatly affect one another as the pitches of the outlets are made smaller, the above technique for suppressing occurrence of unevenness by the cross talk between the outlets is especially suitable for a printer where outlets are arranged at a small pitch which is equal to or smaller than 0.25 mm corresponding to 100 dpi (equal to or larger than 0.021 mm corresponding to 1200 dpi) in each outlet row.

In the printer, there may be a case where the head 21 performs main scanning and sub scanning relatively to the printing paper 9 to perform printing. For example, in a printer where the width of arrangement of a plurality of outlets is narrower than that of a printed area on the printing paper 9 with respect to the width direction and a scanning mechanism for moving the head 21 relatively to the printing paper 9 in the scan direction and the width direction is provided, the head 21 moves in the scan direction (performs main scanning) while ejecting ink and moves in the width direction by a predetermined distance (performs sub scanning) after reaching an end portion of the printing paper 9, and thereafter the head 21 moves in an opposite direction to the immediate main scanning in the scan direction while ejecting ink. As described above, the head 21 performs main scanning relatively to the printing paper 9 in the scan direction and intermittently performs sub scanning in the width direction every time when the main scanning is finished, to print an image on the whole printing paper 9 (in a so-called multi-path system). In such a printing operation, there may be a case where a plurality of dots which are (virtually) formed with one main scanning by each outlet and arranged in the scan direction in a line are treated as a dot group, and a technique for interpolating between adjacent dot groups in a plurality of dot groups arranged in the width direction, in another main scanning of the head 21 (interlace in the sub scan direction) is used. However, in order to print an image on the printing paper 9 at higher speed, it is preferable the plurality of outlets included in each module of the head 21 are arranged so as to cover an entire printing area on the printing paper 9 with respect to the width direction and printing is completed by passing the printing paper 9 below the head 21 once (i.e., in one-path system).

In the printing operation in the multi-path system, in a case where a technique for interpolating between adjacent dots in a plurality of dots which are (virtually) formed with one main scanning by each outlet, in another main scanning of the head 21 (interlace in the main scan direction) is used, since a time interval of ejection of ink from each outlet becomes relatively longer, occurrence of unevenness by the cross talk between the outlets is suppressed in a printed image at some degree. However, such a technique cannot be used when an image is printed on the printing paper 9 in the one-path system. For this reason, the above technique where while printing is performed, the number of outlets included in each active outlet group which is not brought into the sleep state continuously in the width direction is made to be equal to or larger than 1 and equal to or smaller than the predetermined number in each outlet row to thereby suppress occurrence of unevenness in a printed image caused by the cross talk between the outlets, is especially suitable for the printer 1 for printing an image on the printing paper 9 in the one-path system.

Though a binary halftone image is generated in the above first to third preferred embodiments, a multivalued halftone image may be generated in the printer 1. For example, in a case where each outlet of the head 21 can form a plurality of dots having different sizes on the printing paper 9 by ejecting different amounts of droplets, a threshold value of each element in the threshold matrix is a set of a plurality of sub-threshold values used for determination of a size of a dot, and a pixel value of each pixel in the original image is compared with the plurality of sub-threshold values, to generate a multivalued halftone image where 0 or a value corresponding to the size of a dot is assigned to each of pixels. In order to increase a density in a multivalued halftone image with the sleep pixels, each of a plurality of sub-threshold values of elements in the threshold matrix is multiplied by the modification coefficient, or each of values of pixels in the original image is multiplied by the modification coefficient.

Depending on design of the printer, when a pixel value in the halftone image corresponding to the ejection position on the printing paper 9 of each outlet represents OFF of ejection of ink, a motion in non-writing, e.g., slight oscillatory movement such that droplet is not ejected from the outlet, may be performed. In this case, the above motion in non-writing is performed in each of the outlets brought into the sleep state.

Though, in the printer 1 of FIG. 1, the feeder 3 functions as a scanning mechanism for moving the printing paper 9 in the scan direction, a scanning mechanism for moving the head 21 in the scan direction perpendicular to the arrangement direction of the outlets may be provided. That is to say, movement of the printing paper 9 in the scan direction has only to be relative to the head 21.

In the above first to third preferred embodiments, the computer 11 and the main body control parts 4, 4*a* function as an image data generating apparatus for generating image data used in the printer 1, however, the function of the image data generating apparatus is not necessarily provided together with the main body 12 in the printer 1 as a unit. There may be a case where the data of the final halftone image is generated in the image data generating apparatus which is provided independently of the main body 12 and the data of the final halftone image is inputted to a main body having the head 21 to print an image on the printing paper 9.

A printing medium in the printer 1 may be a film or the like, as well as the printing paper 9.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2007-137507 filed in the Japan Patent Office on May 24, 2007 and Japanese Patent Application No. 2007-290305 filed in the Japan Patent Office on Nov. 8, 2007, the entire disclosures of which are incorporated herein by reference.

What is claimed is:

1. An image data generating method of generating image data used in an inkjet printer, wherein
   said printer comprises a head for ejecting fine droplets of ink onto a printing medium and a scanning mechanism for moving said printing medium relatively to said head in a predetermined scan direction,
   said head has one or more outlet rows arranged in said scan direction, each of said one or more outlet rows includes a plurality of outlets arranged in a width direction perpendicular to said scan direction, and
   said image data generating method comprises the steps of:
   a) preparing a threshold matrix which is an array compared with a grayscale original image in generating a halftone image which represents ON/OFF of ejection of ink from said plurality of outlets in printing, said threshold matrix including sleep elements representing sleep of ejection of ink in each element row which is a plurality of elements arranged in a row direction corresponding to said width direction; and
   b) comparing said threshold matrix with said original image to generate data of a halftone image where while printing is performed, the number of outlets included in each outlet group which is brought into a sleep state continuously in said width direction is made to be equal to or larger than 1 and equal to or smaller than a predetermined number in each of said one or more outlet rows, and the number of outlets included in each outlet group which is not brought into said sleep state continuously in said width direction is made to be equal to or larger than 1 and equal to or smaller than a predetermined number in each of said one or more outlet rows.

2. The image data generating method according to claim 1, wherein
   sleep elements are not continuously positioned in a direction corresponding to said scan direction in said threshold matrix.

3. The image data generating method according to claim 1, wherein
   a mask matrix where elements are arranged in said row direction corresponding to said width direction and a column direction corresponding to said scan direction is prepared, and each row in said mask matrix includes mask elements, and when a basic matrix which is an original matrix of said threshold matrix is tiled with mask matrixes, elements in said basic matrix which are overlapped with said mask elements are changed to sleep elements to generate said threshold matrix.

4. The image data generating method according to claim 1, wherein
a plurality of halftone test images where positions of sleep elements are different from one another are printed on a printing medium in said printer, and positions of said sleep elements included in said threshold matrix are determined on the basis of said plurality of halftone test images printed on said printing medium.

5. The image data generating method according to claim 1, wherein
the number of said sleep elements included in said each element row in said threshold matrix is equal to or smaller than ½ of the number of elements included in said each element row.

6. The image data generating method according to claim 1, wherein
values of elements excluding said sleep elements in said threshold matrix or values of pixels in said original image, are changed so that a density of said halftone image generated with said threshold matrix including said sleep elements is getting close to that of a halftone image generated with a threshold matrix not including sleep elements.

7. The image data generating method according to claim 1, wherein
outlets included in said head are arranged so as to cover a printing area on said printing medium with respect to said width direction in said printer.

8. The image data generating method according to claim 1, wherein
a pitch of outlets in each of said one or more outlet rows is equal to or smaller than 0.25 millimeter.

9. An image data generating method of generating image data used in an inkjet printer, wherein
said printer comprises a head for ejecting fine droplets of ink onto a printing medium and a scanning mechanism for moving said printing medium relatively to said head in a predetermined scan direction,
said head has one or more outlet rows arranged in said scan direction, each of said one or more outlet rows includes a plurality of outlets arranged in a width direction perpendicular to said scan direction, and
said image data generating method comprises the steps of:
a) preparing a halftone image which represents ON/OFF of ejection of ink from said plurality of outlets in printing or a grayscale original image compared with a threshold matrix in generating a halftone image; and
b) making sleep pixels representing sleep of ejection of ink, included in each pixel row which is a plurality of pixels arranged in a row direction corresponding to said width direction in said halftone image or said original image, to generate data of a final halftone image where while printing is performed, the number of outlets included in each outlet group which is brought into a sleep state continuously in said width direction is made to be equal to or larger than 1 and equal to or smaller than a predetermined number in each of said one or more outlet rows, and the number of outlets included in each outlet group which is not brought into said sleep state continuously in said width direction is made to be equal to or larger than 1 and equal to or smaller than a predetermined number in each of said one or more outlet rows.

10. The image data generating method according to claim 9, wherein
sleep pixels included in said halftone image or said original image are not continuously positioned in a direction corresponding to said scan direction.

11. The image data generating method according to claim 9, wherein
a mask matrix where elements are arranged in said row direction corresponding to said width direction and a column direction corresponding to said scan direction is prepared, and each row in said mask matrix includes mask elements, and
when said halftone image or said original image is tiled with mask matrixes, pixels in said halftone image or said original image which are overlapped with said mask elements, are changed to sleep pixels to generate said data of said final halftone image in said step b).

12. The image data generating method according to claim 9, further comprising the step of
printing a plurality of halftone test images where positions of sleep pixels are different from one another, on a printing medium in said printer before said step b), wherein
positions of said sleep pixels included in said halftone image or said original image are determined on the basis of said plurality of halftone test images printed on said printing medium.

13. The image data generating method according to claim 9, wherein
the number of said sleep pixels included in said each pixel row in said halftone image or said original image is equal to or smaller than ½ of the number of pixels included in said each pixel row.

14. The image data generating method according to claim 9, wherein
said original image is prepared in said step a), and
values of pixels excluding said sleep pixels in said original image or values of elements in said threshold matrix compared with said original image, are changed so that a density of said final halftone image is getting close to that of a halftone image generated in the case that sleep pixels are not made to be included in said original image.

15. The image data generating method according to claim 9, wherein
said halftone image is prepared in said step a); and
values of pixels in an original image used in generation of said halftone image are changed from original values or values of elements in a threshold matrix used in generation of said halftone image are changed from original values, to approximate a density of said final halftone image to a density of a halftone image which is generated from original values of pixels in said original image and original values of elements in said threshold matrix.

16. The image data generating method according to claim 9, wherein
outlets included in said head are arranged so as to cover a printing area on said printing medium with respect to said width direction in said printer.

17. The image data generating method according to claim 9, wherein
a pitch of outlets in each of said one or more outlet rows is equal to or smaller than 0.25 millimeter.

18. A printing method using a head for ejecting fine droplets of ink onto a printing medium, wherein
said head has one or more outlet rows arranged in a predetermined scan direction, each of said one or more outlet rows includes a plurality of outlets arranged in a width direction perpendicular to said scan direction, said printing method comprises the steps of:

a) moving said printing medium relatively to said head in said scan direction; and b) performing ejection control of ink from said head while setting outlets of a sleep state in each of said one or more outlet rows, in parallel with said step a), and the number of outlets included in each outlet group which is brought into said sleep state continuously in said width direction is made to be equal to or larger than 1 and equal to or smaller than a predetermined number in each of said one or more outlet rows, and the number of outlets included in each outlet group which is not brought into said sleep state continuously in said width direction is made to be equal to or larger than 1 and equal to or smaller than a predetermined number in each of said one or more outlet rows, in said step b).

19. The printing method according to claim 18, wherein when outlets of said sleep state are set in each of said one or more outlet rows, an ink ejection volume from each of the other outlets is increased as compared to the case where outlets of said sleep state are not set in each of said one or more outlet rows.

20. An image data generating apparatus for generating image data used in an inkjet printer, wherein said printer comprises a head for ejecting fine droplets of ink onto a printing medium and a scanning mechanism for moving said printing medium relatively to said head in a predetermined scan direction, said head has one or more outlet rows arranged in said scan direction, each of said one or more outlet rows includes a plurality of outlets arranged in a width direction perpendicular to said scan direction, and said image data generating apparatus comprises:

a memory for storing a threshold matrix which is an array compared with a grayscale original image in generating a halftone image which represents ON/OFF of ejection of ink from said plurality of outlets in printing, said threshold matrix including sleep elements representing sleep of ejection of ink in each element row which is a plurality of elements arranged in a row direction corresponding to said width direction; and an image data generator for comparing said threshold matrix with said original image to generate data of a halftone image where while printing is performed, the number of outlets included in each outlet group which is brought into a sleep state continuously in said width direction is made to be equal to or larger than 1 and equal to or smaller than a predetermined number in each of said one or more outlet rows, and the number of outlets included in each outlet group which is not brought into said sleep state continuously in said width direction is made to be equal to or larger than 1 and equal to or smaller than a predetermined number in each of said one or more outlet rows.

21. The image data generating apparatus according to claim 20, wherein sleep elements are not continuously positioned in a direction corresponding to said scan direction in said threshold matrix.

22. The image data generating apparatus according to claim 20, wherein a mask matrix where elements are arranged in said row direction corresponding to said width direction and a column direction corresponding to said scan direction is prepared, and each row in said mask matrix includes mask elements, and when a basic matrix which is an original matrix of said threshold matrix is tiled with mask matrixes, elements in said basic matrix which are overlapped with said mask elements are changed to sleep elements to generate said threshold matrix.

23. The image data generating apparatus according to claim 20, wherein a plurality of halftone test images where positions of sleep elements are different from one another are printed on a printing medium in said printer, and positions of said sleep elements included in said threshold matrix are determined on the basis of said plurality of halftone test images printed on said printing medium.

24. The image data generating apparatus according to claim 20, wherein the number of said sleep elements included in said each element row in said threshold matrix is equal to or smaller than ½ of the number of elements included in said each element row.

25. The image data generating apparatus according to claim 20, wherein values of elements excluding said sleep elements in said threshold matrix or values of pixels in said original image, are changed so that a density of said halftone image generated with said threshold matrix including said sleep elements is getting close to that of a halftone image generated with a threshold matrix not including sleep elements.

26. The image data generating apparatus according to claim 20, wherein outlets included in said head are arranged so as to cover a printing area on said printing medium with respect to said width direction in said printer.

27. The image data generating apparatus according to claim 20, wherein a pitch of outlets in each of said one or more outlet rows is equal to or smaller than 0.25 millimeter.

28. An image data generating apparatus for generating image data used in an inkjet printer, wherein said printer comprises a head for ejecting fine droplets of ink onto a printing medium and a scanning mechanism for moving said printing medium relatively to said head in a predetermined scan direction, said head has one or more outlet rows arranged in said scan direction, each of said one or more outlet rows includes a plurality of outlets arranged in a width direction perpendicular to said scan direction, and said image data generating apparatus comprises:

a memory for storing a halftone image which represents ON/OFF of ejection of ink from said plurality of outlets in printing or a grayscale original image compared with a threshold matrix in generating a halftone image; and an image data generator for making sleep pixels representing sleep of ejection of ink, included in each pixel row which is a plurality of pixels arranged in a row direction corresponding to said width direction in said halftone image or said original image, to generate data of a final halftone image where while printing is performed, the number of outlets included in each outlet group which is brought into a sleep state continuously in said width direction is made to be equal to or larger than 1 and equal to or smaller than a predetermined number in each of said one or more outlet rows, and the number of outlets included in each outlet group which is not brought into said sleep state continuously in said width direction is made to be equal to or larger than 1 and equal to or smaller than a predetermined number in each of said one or more outlet rows.

29. The image data generating apparatus according to claim 28, wherein
sleep pixels included in said halftone image or said original image are not continuously positioned in a direction corresponding to said scan direction.

30. The image data generating apparatus according to claim 28, wherein
a mask matrix where elements are arranged in said row direction corresponding to said width direction and a column direction corresponding to said scan direction is prepared, and each row in said mask matrix includes mask elements, and
said image data generator changes pixels in said halftone image or said original image to sleep pixels, said pixels being overlapped with said mask elements when said halftone image or said original image is tiled with mask matrixes, to generate said data of said final halftone image.

31. The image data generating apparatus according to claim 28, wherein
a plurality of halftone test images where positions of sleep pixels are different from one another are printed on a printing medium in advance in said printer, and
positions of said sleep pixels included in said halftone image or said original image are determined on the basis of said plurality of halftone test images printed on said printing medium.

32. The image data generating apparatus according to claim 28, wherein
the number of said sleep pixels included in said each pixel row in said halftone image or said original image is equal to or smaller than ½ of the number of pixels included in said each pixel row.

33. The image data generating apparatus according to claim 28, wherein
said original image is stored in said memory, and
values of pixels excluding said sleep pixels in said original image or values of elements in said threshold matrix compared with said original image, are changed so that a density of said final halftone image is getting close to that of a halftone image generated in the case that sleep pixels are not made to be included in said original image.

34. The image data generating apparatus according to claim 28, wherein
said halftone image is stored in said memory; and
values of pixels in an original image used in generation of said halftone image are changed from original values or values of elements in a threshold matrix used in generation of said halftone image are changed from original values, to approximate a density of said final halftone image to a density of a halftone image which is generated from original values of pixels in said original image and original values of elements in said threshold matrix.

35. The image data generating apparatus according to claim 28, wherein
outlets included in said head are arranged so as to cover a printing area on said printing medium with respect to said width direction in said printer.

36. The image data generating apparatus according to claim 28, wherein
a pitch of outlets in each of said one or more outlet rows is equal to or smaller than 0.25 millimeter.

37. An inkjet printer, comprising:
a head for ejecting fine droplets of ink onto a printing medium and having one or more outlet rows arranged in a predetermined scan direction, each of said one or more outlet rows including a plurality of outlets arranged in a width direction perpendicular to said scan direction;
a scanning mechanism for moving said printing medium relatively to said head in said scan direction; and
an ejection controller for performing ejection control of ink from said head while setting outlets of a sleep state in each of said one or more outlet rows, in parallel with relative movement of said printing medium to said head, wherein
while printing is performed, the number of outlets included in each outlet group which is brought into a sleep state continuously in said width direction is made to be equal to or larger than 1 and equal to or smaller than a predetermined number in each of said one or more outlet rows, and the number of outlets included in each outlet group which is not brought into said sleep state continuously in said width direction is made to be equal to or larger than 1 and equal to or smaller than a predetermined number in each of said one or more outlet rows.

38. The printer according to claim 37, wherein
when outlets of said sleep state are set in each of said one or more outlet rows, an ink ejection volume from each of the other outlets is increased as compared to the case where outlets of said sleep state are not set in each of said one or more outlet rows.

* * * * *